United States Patent
Cui et al.

(10) Patent No.: US 10,090,512 B2
(45) Date of Patent: Oct. 2, 2018

(54) ELECTRODE INCLUDING NANOSTRUCTURES FOR RECHARGEABLE CELLS

(75) Inventors: Yi Cui, Stanford, CA (US); Song Han, Foster City, CA (US); Mark C. Platshon, Menlo Park, CA (US)

(73) Assignee: Amprius, Inc., Sunnyvale, CA (US)

( * ) Notice: Subject to any disclaimer, the term of this patent is extended or adjusted under 35 U.S.C. 154(b) by 0 days.

(21) Appl. No.: 13/427,681

(22) Filed: Mar. 22, 2012

(65) Prior Publication Data
US 2012/0183856 A1   Jul. 19, 2012

Related U.S. Application Data

(63) Continuation of application No. 12/437,529, filed on May 7, 2009.

(51) Int. Cl.
| | | |
|---|---|---|
| H01M 4/38 | (2006.01) |
| H01M 4/583 | (2010.01) |
| H01M 4/134 | (2010.01) |
| H01M 4/1395 | (2010.01) |
| H01M 4/36 | (2006.01) |
| H01M 4/66 | (2006.01) |
| H01M 4/75 | (2006.01) |
| H01M 4/02 | (2006.01) |
| H01M 10/0525 | (2010.01) |

(52) U.S. Cl.
CPC ......... *H01M 4/134* (2013.01); *H01M 4/1395* (2013.01); *H01M 4/366* (2013.01); *H01M 4/661* (2013.01); *H01M 4/663* (2013.01); *H01M 4/75* (2013.01); *H01M 4/66* (2013.01); *H01M 10/0525* (2013.01); *H01M 2004/022* (2013.01); *Y10T 29/49108* (2015.01)

(58) Field of Classification Search
None
See application file for complete search history.

(56) References Cited

U.S. PATENT DOCUMENTS

| | | |
|---|---|---|
| 4,366,215 A | 12/1982 | Coetzer et al. |
| 4,436,796 A | 3/1984 | Huggins et al. |
| 5,457,343 A | 10/1995 | Ajayan |
| 5,997,832 A | 12/1999 | Lieber |
| 6,083,644 A | 7/2000 | Watanabe et al. |
| 6,090,505 A | 7/2000 | Shimamura et al. |
| 6,334,939 B1 | 1/2002 | Zhou |
| 6,423,453 B1 | 7/2002 | Noda |
| 6,514,395 B2 | 2/2003 | Zhou |
| 6,667,099 B1 | 12/2003 | Greiner et al. |
| 7,402,829 B2 | 7/2008 | Green |
| 7,408,829 B2 | 8/2008 | Kuang et al. |
| 7,438,759 B2 | 10/2008 | Zhang et al. |
| 7,682,750 B2 | 3/2010 | Chen |
| 7,816,031 B2 | 12/2010 | Cui et al. |
| 8,206,569 B2 | 6/2012 | Lopatin et al. |
| 8,241,372 B2 | 8/2012 | Cheng et al. |
| 8,252,245 B2 | 8/2012 | Tonkovich et al. |
| 8,257,866 B2 | 9/2012 | Loveness et al. |
| 8,263,258 B2 | 9/2012 | Nakazato et al. |
| 8,367,240 B2 | 2/2013 | Honda |
| 8,420,258 B2 | 4/2013 | Rojeski |
| 8,450,012 B2 | 5/2013 | Cui et al. |
| 8,481,214 B2 | 7/2013 | Rojeski |
| 8,491,718 B2 | 7/2013 | Chaudhari |
| 8,556,996 B2 | 10/2013 | Loveness et al. |
| 8,652,683 B2 | 2/2014 | Rojeski |
| 8,877,374 B2 | 11/2014 | Cui et al. |
| 9,780,365 B2 | 10/2017 | Liu et al. |
| 2002/0028384 A1 | 3/2002 | Krasnov et al. |
| 2002/0102461 A1 | 8/2002 | Baker et al. |
| 2002/0148727 A1 | 10/2002 | Zhou et al. |
| 2003/0175589 A1 | 9/2003 | Kaminaka et al. |
| 2003/0178104 A1 | 9/2003 | Sekine |
| 2003/0203139 A1 | 10/2003 | Ren et al. |
| 2004/0126659 A1 | 7/2004 | Graetz |
| 2005/0100793 A1 | 5/2005 | Jonghe et al. |
| 2005/0153208 A1 | 7/2005 | Konishiike et al. |
| 2005/0175901 A1 | 8/2005 | Kawakami et al. |
| 2005/0238810 A1 | 10/2005 | Scaringe et al. |
| 2005/0279274 A1 | 12/2005 | Nui et al. |
| 2006/0040182 A1 | 2/2006 | Kawakami et al. |
| 2006/0066201 A1 | 3/2006 | Ra et al. |
| 2006/0097691 A1 | 5/2006 | Green |
| 2006/0147797 A1 | 7/2006 | Wu et al. |
| 2006/0154141 A1 | 7/2006 | Salot et al. |
| 2006/0165988 A1 | 7/2006 | Chinag et al. |

(Continued)

FOREIGN PATENT DOCUMENTS

| | | |
|---|---|---|
| CN | 1705148 | 12/2005 |
| CN | 1705418 A | 12/2005 |

(Continued)

OTHER PUBLICATIONS

Marczak et al., "The individual core/shell silicon nanowire structure probed by Raman spectroscopy", P hys. Status Solidi C 6, No. 9, 2053-2055 (2009).*

Campbell et al., "Preparation of mesoporous silica templated metal nanowire films on foamed nickel substrates", Microporous and Mesoporous Materials 97 (2006) 114-121.*

Chan et al., Structural and electrochemical study of the reaction of lithium with silicon nanowires, Journal of Power Sources 189 (2009) 34-39.*

Huang et al., "Fabrication of Silicon Nanowire Arrays with Controlled Diameter, Length, and Density", Adv. Mater. 2007, 19, 744-748.*

Aifantis et al., "High energy density lithium batteries", 2010 Wiley-VCH Verlag GmbH & Co. KGaA, Weinheim (Chapter 6: Next-generation anodes for secondary Li-Ion batteries) ISBN: 978-3-527-32407-1.

(Continued)

*Primary Examiner* — Ladan Mohaddes
(74) *Attorney, Agent, or Firm* — Weaver Austin Villeneuve & Sampson LLP

(57) ABSTRACT

A lithium ion battery electrode includes silicon nanowires used for insertion of lithium ions and including a conductivity enhancement, the nanowires growth-rooted to the conductive substrate.

32 Claims, 13 Drawing Sheets

(56) References Cited

U.S. PATENT DOCUMENTS

| | | |
|---|---|---|
| 2006/0204853 A1 | 9/2006 | Chen |
| 2006/0216603 A1 | 9/2006 | Choi |
| 2007/0065720 A1 | 3/2007 | Hasegawa et al. |
| 2007/0095276 A1* | 5/2007 | Sunkara et al. ............... 117/103 |
| 2007/0148544 A1 | 6/2007 | Le |
| 2007/0154808 A1 | 7/2007 | Konishiike et al. |
| 2007/0298168 A1 | 12/2007 | Ajayan et al. |
| 2008/0044732 A1 | 2/2008 | Salot et al. |
| 2008/0145762 A1 | 6/2008 | Adachi et al. |
| 2008/0213603 A1 | 9/2008 | Kobayashi et al. |
| 2008/0274403 A1 | 11/2008 | Kim et al. |
| 2008/0280169 A1 | 11/2008 | Niu et al. |
| 2008/0280207 A1 | 11/2008 | Patoux et al. |
| 2009/0004566 A1 | 1/2009 | Shirane et al. |
| 2009/0042102 A1 | 2/2009 | Cui et al. |
| 2009/0061319 A1 | 3/2009 | Kim et al. |
| 2009/0068553 A1 | 3/2009 | Firsich et al. |
| 2009/0117472 A1 | 5/2009 | Iwamoto |
| 2009/0162746 A1 | 6/2009 | Honda |
| 2009/0169996 A1* | 7/2009 | Zhamu et al. ................. 429/221 |
| 2009/0188544 A1 | 7/2009 | Kobayashi et al. |
| 2009/0214942 A1 | 8/2009 | Frank et al. |
| 2009/0214944 A1 | 8/2009 | Rojeski |
| 2009/0246628 A1 | 10/2009 | Adachi et al. |
| 2009/0269511 A1 | 10/2009 | Zhamu et al. |
| 2009/0291371 A1 | 11/2009 | Konishiike et al. |
| 2009/0305131 A1 | 12/2009 | Kumar et al. |
| 2009/0305135 A1 | 12/2009 | Shi et al. |
| 2009/0316335 A1 | 12/2009 | Simon et al. |
| 2010/0043877 A1 | 2/2010 | Wang et al. |
| 2010/0122725 A1* | 5/2010 | Buchine et al. .............. 136/255 |
| 2010/0159337 A1 | 6/2010 | Matsumoto et al. |
| 2010/0209775 A1 | 8/2010 | Kim et al. |
| 2010/0237272 A1 | 9/2010 | Chaudhari |
| 2010/0266897 A1 | 10/2010 | Lee et al. |
| 2010/0285358 A1 | 11/2010 | Cui et al. |
| 2010/0291441 A1 | 11/2010 | Ugaji et al. |
| 2010/0310941 A1 | 12/2010 | Kumta et al. |
| 2010/0330421 A1 | 12/2010 | Cui et al. |
| 2010/0330423 A1 | 12/2010 | Cui et al. |
| 2011/0027655 A1 | 2/2011 | Rojeski |
| 2011/0111294 A1 | 5/2011 | Lopez et al. |
| 2011/0111304 A1 | 5/2011 | Cui et al. |
| 2011/0159365 A1 | 6/2011 | Loveness et al. |
| 2011/0159367 A1 | 6/2011 | Kim et al. |
| 2011/0189510 A1 | 8/2011 | Caracciolo et al. |
| 2011/0205688 A1 | 8/2011 | Ray et al. |
| 2011/0287318 A1 | 11/2011 | Loveness et al. |
| 2012/0028123 A1 | 2/2012 | Asari et al. |
| 2012/0070741 A1 | 3/2012 | Liu et al. |
| 2012/0183856 A1 | 7/2012 | Cui et al. |
| 2012/0301785 A1* | 11/2012 | Buchine et al. ........... 429/218.1 |
| 2012/0301789 A1 | 11/2012 | Loveness et al. |
| 2013/0004657 A1 | 1/2013 | Xu et al. |
| 2013/0011736 A1 | 1/2013 | Loveness et al. |
| 2013/0078523 A1 | 3/2013 | Rojeski |
| 2013/0143124 A1 | 6/2013 | Lee et al. |
| 2013/0344383 A1 | 12/2013 | Loveness et al. |
| 2015/0325852 A1 | 11/2015 | Wang et al. |

FOREIGN PATENT DOCUMENTS

| | | |
|---|---|---|
| CN | 1979828 A | 6/2007 |
| CN | 101346834 | 1/2009 |
| CN | 101346836 A | 1/2009 |
| CN | 101356666 A | 1/2009 |
| CN | 101356670 A | 1/2009 |
| CN | 101560694 | 10/2009 |
| CN | 101689628 A | 3/2010 |
| CN | 101356666 B | 10/2010 |
| CN | 101953014 A | 1/2011 |
| CN | 102460782 | 5/2012 |
| CN | 101689628 B | 6/2012 |
| CN | 102959775 A | 3/2013 |
| EP | 845828 | 10/2002 |
| EP | 1494302 | 1/2005 |
| EP | 2427928 | 3/2012 |
| FR | 2880198 | 6/2006 |
| GB | 2470056 | 11/2010 |
| JP | 2007/012310 | 1/2007 |
| JP | 2007-061945 | 3/2007 |
| JP | 2008-026595 | 2/2008 |
| JP | 2008-192594 | 8/2008 |
| JP | 2008/269827 | 11/2008 |
| JP | 2008-269827 | 11/2008 |
| JP | 2008-305781 | 12/2008 |
| JP | 2009-021226 | 1/2009 |
| JP | 2010-525549 | 7/2010 |
| JP | 2010/538444 | 12/2010 |
| JP | 2012-526364 | 10/2012 |
| JP | 2012-527735 | 11/2012 |
| JP | 2013-521621 | 6/2013 |
| JP | 2012556203 | 6/2013 |
| KR | 2009/0019339 | 2/2009 |
| WO | 2006/123049 | 11/2006 |
| WO | 2007/083152 | 1/2007 |
| WO | 2007/071778 | 6/2007 |
| WO | 2007/083155 | 2/2008 |
| WO | 2008/044449 | 4/2008 |
| WO | 2008/139157 | 11/2008 |
| WO | 2009/008558 | 1/2009 |
| WO | 2009/009206 | 1/2009 |
| WO | 2009/010757 | 1/2009 |
| WO | 2009/010758 | 1/2009 |
| WO | 2009/010759 | 1/2009 |
| WO | 2009/031715 | 3/2009 |
| WO | 2009/033015 | 3/2009 |
| WO | 2009/129490 | 10/2009 |
| WO | 2010/100599 | 9/2010 |
| WO | 2010/129910 | 11/2010 |
| WO | 2010/138617 | 12/2010 |
| WO | 2010/138619 | 12/2010 |
| WO | 2011/053553 | 5/2011 |
| WO | 2011/056847 | 5/2011 |
| WO | 2011/094642 | 8/2011 |
| WO | 2011/109477 | 9/2011 |
| WO | 2011/149958 | 12/2011 |
| WO | 2012/027360 | 3/2012 |
| WO | 2012/054767 | 4/2012 |
| WO | 2015/175509 | 11/2015 |

OTHER PUBLICATIONS

Kasavajjula et al., "Nano- and bulk-silicon-based insertion anodes for lithium-ion secondary cells", Journal of Power Sources 163 (2007) 1003-1039.
U.S. Appl. No. 12/437,529, Office Action dated May 13, 2011.
U.S. Appl. No. 12/437,529, Office Action dated Oct. 20, 2011.
U.S. Appl. No. 12/437,529, Office Action dated Dec. 22, 2011.
Cui, Yi et al., "Doping and electrical transport in silicon nanowires", The Journal of Physical Chemistry, vol. 104, No. 22, Jun. 8, 2000.
U.S. Appl. No. 13/277,821, "High capacity battery electrode structures," Liu et al., filed Oct. 20, 2011.
U.S. Appl. No. 61/503,819, "High capacity battery electrode structures," Liu et al., filed Oct. 20, 2011.
WO patent application No. PCT/US2010/036235, International Search Report and Written Opinion dated Jan. 28, 2001.
WO patent application No. PCT/US2011/026816, International Search Report and Written Opinion dated Oct. 18, 2011.
WO patent application No. PCT/US2010/036237, International Search Report dated May 26, 2010.
WO patent application No. PCT/US2010/036237, Written Opinion dated May 27, 2011.
Cui, Li-Feng et al., "Crystallline-amorphous core-shell silicon nanowires for high capacity and high current battery electrodes," Nano Letters, 2009, vol. 9, No. 1 491-495, Dec. 23, 2008.
Kim, Cheol-Joo et al., "Spontaneous chemical vapor growth of NiSi nanowires and their metallic properties," Advanced Materials, 2007, 19, 3637-3642, Oct. 16, 2007.
Chan, Candace K. et al., "Surface chemistry and morphology of the solid electrolyte interphase on silicon nanowire lithium-ion battery andoes," Journal of Power Sources 189 (2009) 1132-1140.

(56) References Cited

OTHER PUBLICATIONS

Cui, Li-Feng et al., "Carbon-silicon core-shell nanowires as high capacity electrode for lithium ion batteries," Nano Letters, published on Aug. 5, 2009 on http://pubs.acs.org.
Esmanski, Alexei et al., "Silicon inverse-opal-based macroporous materials as negative electrodes for lithium ion batteries," Advanced Functional Materials, 2009, 1999-2010, May 7, 2009.
Park, Mi-Hee et al., "Supporting information for silicon nanotube battery anodes," Sep. 11, 2009.
Kim, Hyunjung et al., "Three-dimensional porous silicon particles for use in high-performance lithium secondary batteries," Angewandte Chemie, Int. Ed. 2008, 47, 10151-10154, Nov. 17, 2008.
For high-performance anode material in lithium-ion batteries, After Gutenberg, downloaded from http://jcwinnie.biz/wordpress/?p=2864 on Dec. 25, 2009.
Magasinki, A. et al., "High-performance lithium-ion anodes using a hierarchical bottom-up approach," Nature Materials, published online at www.nature.com/naturematerials Mar. 14, 2010.
Kang, Kubum et al., "The role of NiOx overlayers on spontaneous growth of NiSix nanowires from Ni seed layers," Nano Letters 2008, vol. 8, No. 2 431-436, Jan. 12, 2008.
Kang, Kibum et al., Unconventional roles of metal catalysts in chemical-vapor syntheses of single-crystalline nanowires,: Journal of Applied Physics 105, 122407 (2009).
Zhang, Hong-Li et al., "The facile synthesis of nickel silicide nanobelts and nanosheets and their application in electrochemical energy storage," Nanotechnology 19 (2008) 165606, (7 pp), Mar. 20, 2008.
Chan et al., "High-performance lithium battery anodes using silicon nanowires," Nature Nanotechnology, vol. 3, Jan. 2008.
WO patent application No. PCT/US2010/034106, International Search Report and Written Opinion dated Feb. 7, 2011.
U.S. Appl. No. 11/837,291, Office Action dated Feb. 18, 2009.
U.S. Appl. No. 11/837,291, Office Action dated Oct. 26, 2009.
U.S. Appl. No. 11/837,291, Office Action dated Jan. 7, 2010.
U.S. Appl. No. 11/837,291, Office Action dated Apr. 22, 2010.
U.S. Appl. No. 11/837,291, Notice of Allowance dated Aug. 10, 2010.
U.S. Appl. No. 12/895,424, Office Action dated Nov. 17, 2010.
Ping et al., "Characterization of SnO2 nanowires as anode materials for Li-ion batteries." Applied Physics Letters 87(11), 2005 (Abstract only).
Sharma et al., "Structural characteristics and connection mechanism of gold-catalyzed bridging silicon nanowires," Journal of Crystal Growth 280 (2005) 562-568.
Levitt, "Whisker Technology." Wiley Interscience, 1970.
Li et al., "Rate capabilities of nanostructured LiMn2O4 electrodes in aqueous electrolyte." J. Electrochem. Soc. 147, 2044-2049 (2000).
Sharma et al., "Thermodynamic properties of the lithium-silicon system." Journal of the Electrochemical Society 123, 1763-1768 (Dec. 1976).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Li et al., "A high capacity nano-Si composite anode material for lithium rechargeable batteries," Electrochemical and Solid-State Letters, 2 (11) 547-549 (1999).
Uehara et al., "Thick vacuum deposited silicon films suitable for the anode of Li-ion battery," Journal of Power Sources 146, 441-444 (2005).
Westwater et al., "Growth of silicon nanowires via gold/silane vapor-liquid-solid reaction," Journal Va. Sci. Technology B 15(3), 554-557 (May/Jun. 1997).
Yazawa et al., "Effect of one monolayer of surface gold atoms on the epitaxial growth of InAs nanowhiskers," Appl. Phys. Lett. 61 (17), 2051-2053 (Oct. 1992).
EP patent application No. 08831531.2, European Search Report dated Oct. 27, 2010.

Li et al., "Freestanding mesoporous quasi-single-crystalline Co3O4 nanowire arrays," J. Am. Chem. Soc. 2006, 128, 14258-14259, Oct. 18, 2006.
Sharma et al., "Diameter control of Ti-catalyzed silicon nanowires," Journal of Crystal Growth 267 (2004) 613-618, Apr. 20, 2004.
Pan et al., Nanobelts of Semiconduction Oxides, *Science* Mar. 9, 2001: 1947-1949.
Huang et al., Catalytic Growth of Zinc Oxide Nanowires by Vapor Transport, Adv. Mater., 13, 113-116 (2001).
Morales, et al., A Laser Ablation Method for the Synthesis of Crystalline Semiconductor Nanowires, Science vol. 279, Jan. 9, 1998.
Dick, et al A New Understanding of Au-Assisted Growth of Ill-V Semiconductor Nanowires, Adv. Funct. Mater. 15, 1603-1610 (2005).
Chan, C.K., et al., High-Performance Lithium Battery Anodes Using Silicon Nanowires, Nature, vol. 3, Jan. 2008.
Chan, C.K., et al., "High Capacity Li Lon Battery Anodes Using Ge Nanowires", Nano Letters, 2008, vol. 8, No. 1, 307-309.
Che, G., et al., "Carbon Nanotubule Membranes for Electrochemical Energy Storage and Production". Nature 393, 346-349 (1998).
Park, M.S. et al., "Preparation and Electrochemical Properties of SnO2 Nanowires for Application in Lithium-ion Batteries" Angew. Chem. Int. Edn 46, 750-753 (2007).
Huggins, R.A. & Nix, W.D. Decrepitation Model for Capacity Loss During Cycling of Alloys in Rechargeable Electrochemical Systems, Ionics 6, 57-63 (2000).
Lee, Y.M., et al. SEI layer formation on amorphous Si thin electrode during precycling. J. Electrochem. Soc. 154, A515-A519 (2007).
Green, M., et al Structured silicon anodes for lithium battery applications. Electrochem. Solid State Lett. 6, A75-A79 (2003).
Ryu, J.H., et al Failure modes of silicon powder negative electrode in lithium secondary batteries. Electrochem. Solid-State Lett. 7, A306-A309 (2004).
Gao, et al., "Alloy formation in nanostructured silicon." Adv. Mater. 13, 816-819 (2001).
Wang, Y., et al. Epitaxial growth of silicon anowires using an aluminum catalyst. Nature Naotech. 1, 186-189 (2006).
Wu, Y. et al. Controlled growth and structures of molecular-scale silicon nanowires. Nao Lett. 4, 433-436 (2004).
Zhou, Controlled Li Doping of Si Nanowires (Applied Physics Letters vol. 75, No. 16), Oct. 18, 1999.
Carbon nanofiber product sheet, Applied Science 2008, downloaded from http://www.apsci.com/ngm-pyrol.html on May 2011.
U.S. Appl. No. 12/904,559, "Composite nanowire compositions and methods of synthesis," Qu et al., filed Oct. 14, 2010.
WO patent application No. PCT/US2011/037767, International Search Report and Written Opinion dated Jan. 16, 2012.
WO patent application No. PCT/US2011/057159, International Search Report and Written Opinion dated Jun. 11, 2012.
Zhang, et al., "Pyrolytic Carbon-coated Silicon/Carbon Nanotube Composites: Promising Application for Li-ion Batteries," *Int. J. Nanomanufacturing*, vol. 2, Nos. 1/2, 2008, pp. 4-15.
Office Action dated Apr. 5, 2012 for U.S. Appl. No. 13/039,031.
Notice of allowance dated Jul. 26, 2012 for U.S. Appl. No. 13/039,031.
"Sweet nanotech batteries: Nanotechnology could solve lithium battery charging problems," PhysOrg.com, Received online Mar. 23, 2012 from http://phys.org/news127043619.html.
Lee et al., "Anomalous growth and characterization of carbon-coated nickel silicide nanowires," Chemical Physics Letters 384, 2004, pp. 215-218.
U.S. Appl. No. 13/564,324, titled Template Electrode Structures for Depositing Action Materials, filed Aug. 1, 2012.
U.S. Appl. No. 13/540,484, "Template Electrode Structures with Enhanced Adhesion Characteristics," Liu et al., filed Jul. 2, 2012.
U.S. Office Action dated Sep. 17, 2012 issued in U.S. Appl. No. 13/540,484.
Quasi-2D Structures Make Better Batteries, Tyrell, James, Apr. 17, 2008, pp. 1-2.
Nickel Silicide Nanobelts and Sheets in Li-ion Anodes Capacity, Green Car Congress, Apr. 19, 2009, pp. 1-3.
Frackowiak, E., et al., "Electrochemical Storage of Lithium Multiwalled Carbon Nanotubes," Carbon 37, 1999, pp. 61-69.
U.S. Appl. No. 12/787,138, Office Action dated Apr. 26, 2012.

(56) References Cited

OTHER PUBLICATIONS

U.S. Appl. No. 12/787,138, Office Action dated Oct. 11, 2012.
S.K. Samudrala and S. Bandyopadhyay: Hybrid Nanocomposite for Nanotechnology, 2009, p. 245.
U.S. Appl. No. 12/787,138, Notice of Allowance dated Jan. 28, 2013.
TW patent publication No. 201238125, published Sep. 16, 2012, English Abstract.
U.S. Appl. No. 13/540,484, Notice of Allowance dated Feb. 22, 2013.
U.S. Appl. No. 12/787,168, Office Action dated Jan. 10, 2013.
U.S. Appl. No. 13/891,035, "Interconnected hollow nanostructures containing high capacity active materials for use in rechargeable batteries," Cui et al., filed May 10, 2013.
EP patent application No. 10781151.5, Supplemental European Search Report dated Jun. 28, 2013.
EP patent application No. 10781153.1, Supplemental European Search Report dated Jul. 4, 2013.
Cheng Mu et al., "Silicon nanotube array/gold electrode for direct electrochemistry of cytochrome e," J. Phys. Chem. B 2007, 111, 1491-1495, Nov. 21, 2006.
U.S. Appl. No. 12/787,168, Office Action dated Sep. 10, 2013.
U.S. Appl. No. 13/914,491, "Template electrode structures for depositing active materials," filed Jun. 10, 2013, Loveness et al.
U.S. Appl. No. 13/277,821, Office Action dated Feb. 25, 2013.
WO patent application No. PCT/US2012/045313, International Search Report and Written Opinion dated Jan. 21, 2013.
Park, Mi-Hee et al., "Silicon nanotube battery anodes," Nano Letters 2009, vol. 9, No. 11 3844 3847, Sep. 11, 2009.
JP patent application No. 2012-513226, Japanese Office Action dated Feb. 4, 2014.
Emmenegger, et al., "Carbon Nanotubes Synthesized on Metallic Substrates," Applied Surface Science, Aug. 1, 2000, pp. 452-456.
CN patent application No. 201080023257.9, Chinese Office Action dated Dec. 12, 2013.
U.S. Appl. No. 12/787,168, Office Action dated Feb. 26, 2014.
U.S. Appl. No. 13/277,821, Office Action dated Oct. 11, 2013.
CN patent application No. 201080023345.9, Office Action dated Dec. 27, 2013.
EP patent application No. 08831531.2, Supplemental European Search Report dated Jul. 4, 2013.
EP patent application No. 10781151.5, Search Report dated Jun. 28, 2013.
JP patent application No. 2012-510025, Notice of Reasons for Rejection dated Jan. 7, 2014.
JP patent application No. 2012-513225, Notification of Reasons for Rejection dated Dec. 17, 2013.
WO patent application No. PCT/WO2010/036237, International Search Report and Written Opinion dated Feb. 1, 2011.
Chaudhari, P. et al., "Heteroepitaxial silicon film growth at 600 degrees C. for an Al—Si eutectic melt," Thin Solid Films 518 (2010) 5368-5371.
Pre-Issuance Submission by Third Party dated Jan. 15, 2014, received in U.S. Appl. No. 13/914,491.
EP patent application No. 10772907.1, Supplemental European Search Report dated Jul. 4, 2013.
JP Application No. 2012-510025, Decision of Rejection dated Aug. 5, 2014.
U.S. Appl. No. 13/891,035, Office Action dated Jun. 19, 2014.
U.S. Appl. No. 12/787,168, Final Office Action dated Nov. 6, 2014.
Pre-Issuance Submission by Third Party dated Jan. 21, 2014, received in U.S. Appl. No. 13/540,484.
U.S. Appl. No. 13/277,821, Office Action dated Apr. 10, 2014.
U.S. Appl. No. 13/114,413, Office Action dated Jun. 19, 2014.
JP patent application No. 2012-556203, Office Action dated Aug. 26, 2014.
CN patent application No. 201180019460.3, Office Action dated Jul. 2, 2014.
JP patent application No. 2013-501400, Decision of Rejection dated Aug. 19, 2014.
CN patent application No. 201180022062.7, Office Action dated Aug. 25, 2014.
CN patent application No. 201080026302.6, Office Action dated Oct. 23, 2013.
CN patent application No. 201080026302.6, Office Action dated Aug. 8, 2014.
CN patent application No. 201080026302.6, Office Action dated Mar. 23, 2015.
Israel Office Action dated May 4, 2015, IL patent application No. 216100.
CN patent application No. 201080026302.6, Chinese Office Action dated Nov. 10, 2015.
IL patent application No. 216100, Office Action (Notification of Deficiencies Prior to Allowance of Patent Application) dated Jun. 22, 2016.
U.S. Appl. No. 13/914,491, Office Action dated Dec. 3, 2014.
TW patent application No. 100120247, Office Action dated Feb. 9, 2015.
CN patent application No. 201180019460.3, Office Action dated May 6, 2015.
JP patent application No. 2012-556203, Office Action dated Jul. 14, 2015.
U.S. Appl. No. 13/914,491, Notice of Allowance dated Jun. 19, 2015.
CN Office Action issued in Application No. 201280038037.2 dated Aug. 5, 2015.
CN patent application No. 11751259.0, Office Action dated Dec. 12, 2016.
EP Search Report issued in Application No. 12807729.4 dated Jan. 11, 2017.
Sun et al, Synthesis of Nickel Mono-Silicide Nanowire by Chemical Vapor Deposition on Nickel Film: Role of Surface Nickel Oxides, Japanese Journal of Applied Physics, vol. 48, No. 4, Apr. 1, 2009, p. 84C138, XP855323364.
CN patent application No. 11751259.0, Extended Search Report dated Mar. 16, 2017.
CN patent application No. 201510674597.2, Office Action and Search Report dated Mar. 28, 2017.
JP patent application No. 2016-077671, Office Action dated Jul. 4, 2017.
KR patent application No. 10-2012-7024928 , Office Action dated Aug. 28, 2017.
Board of Appeal Decision, dated Nov. 15, 2017, issued in U.S. Appl. No. 13/427,681.
Office Action dated Jan. 2, 2018 for U.S. Appl. No. 14/859,125.
U.S. Appl. No. 15/694,470, filed Sep. 1, 2017, Liu et al.

\* cited by examiner

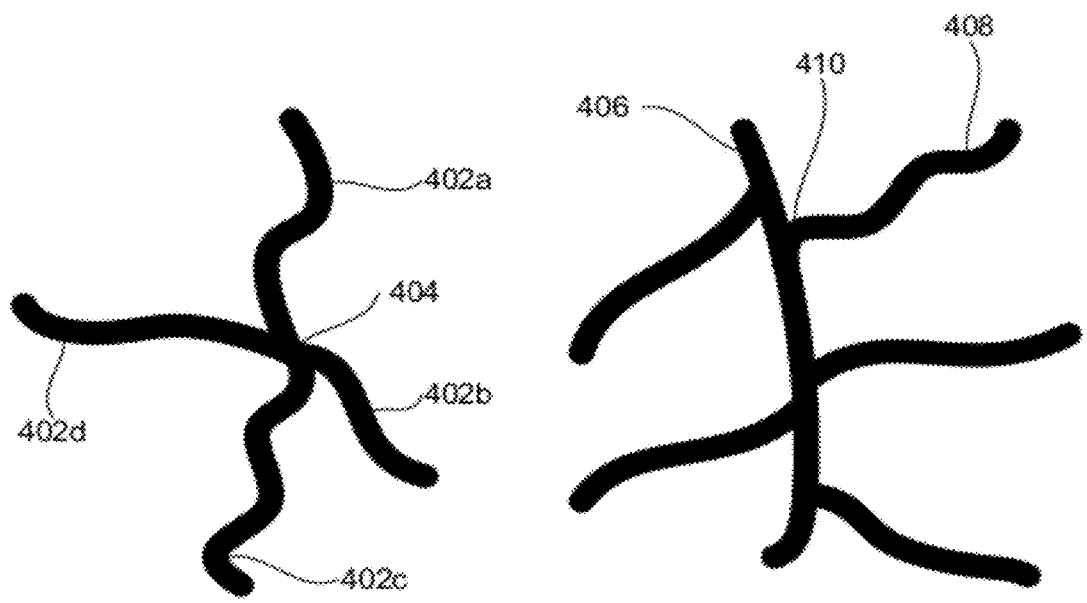
FIG. 4A
FIG. 4B
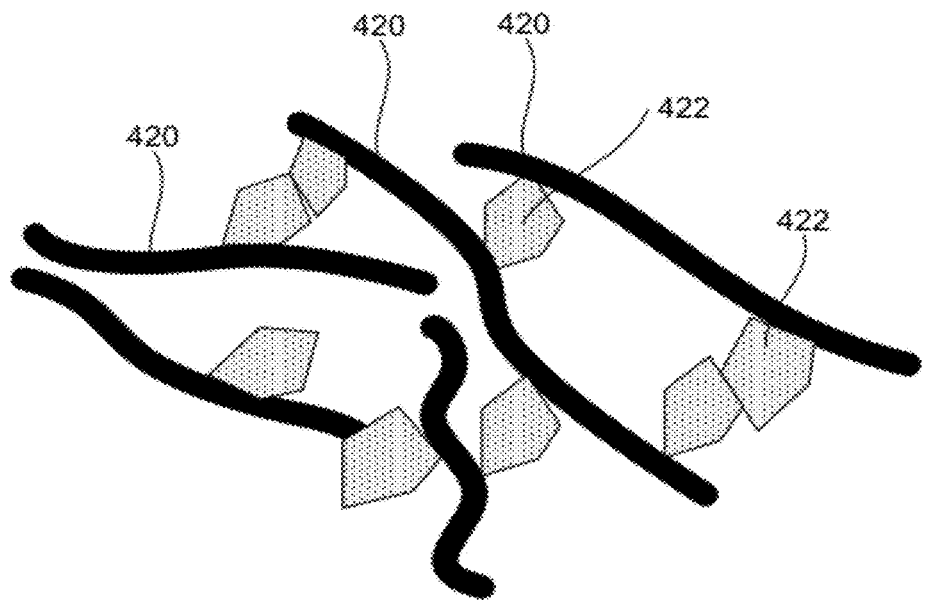
FIG. 4C

ELECTRODE INCLUDING NANOSTRUCTURES FOR RECHARGEABLE CELLS

CROSS REFERENCE TO RELATED APPLICATION

This application is a continuation of prior application Ser. No. 12/437,529 filed on May 7, 2009, now pending, the disclosure of which is incorporated by reference herein in its entirety.

FIELD OF THE INVENTION

The present invention relates generally to electrochemical cell components and methods of preparing such components and, more specifically, to battery electrodes containing nanowires configured to interact with electrochemically active ions and methods of preparing such electrodes and batteries including such electrodes.

BACKGROUND OF THE INVENTION

The demand for high capacity rechargeable batteries is extensive. Many applications, such as aerospace, medical devices, portable electronics, automotive and many others, demand high gravimetric and or volumetric capacity batteries. Development of the lithium ion technology has provided some advances in this area, but higher capacities are still very desirable. Lithium ion cells generally use anodes containing graphite powder that has theoretical capacity of only about 372 mAh/g.

Silicon is an attractive insertion material for lithium and other electrochemically active ions. A theoretical capacity of silicon in lithium ion cell has been estimated at about 4200 mAh/g. Yet use of silicon and many other high capacity materials for battery applications has been constrained by substantial changes in volume (swelling) of these materials during insertion of active ions. For example, silicon swells as much as 400% during lithiation. Volume changes of this magnitude cause substantial stresses in silicon structures in the negative electrodes resulting in pulverization of the structures, loss of electrical connections within the electrode, and capacity fading of the battery. Further, many high capacity materials, such as silicon, have poor electrical conductivity, and often require special design features or conductive additives that may negatively impact battery capacity. Overall, there is a need for improved application of high capacity active materials in battery electrodes that minimize the drawbacks described above.

OVERVIEW

The present invention provides new high capacity materials, such as certain silicon structures, in battery electrodes. For example, substrate-rooted silicon nanowires have shown substantial increase in battery performance including ability to maintain discharge capacity of 1000 mAh/g over 180 cycles. Shaping active materials as nanowires opens doors to many new high capacity active materials that have had limited applications because of extensive swelling, poor electrical conductivity, and other characteristics. Nanowires may be shaped and dimensioned in such a way that internal stresses are kept below their fracture limit during swelling, while high conductivity is maintained due to the nanowire length and substrate-rooted attachment. The conductivity of the nanowires may be further increased by incorporating other materials into the nanowire structure in various forms, e.g., doping, alloying, core-shell configurations of conductive materials, and other approaches. Further, various types of substrates and substrate treatments may be used to accommodate swelling of nanowires and their enhance electrical connections with one another and the substrate.

In certain embodiments, a lithium ion battery electrode includes a conductive substrate and silicon containing nanowires growth-rooted to the conductive substrate. The nanowires include a conductivity enhancement component for reducing electrical resistance of the nanowires. The nanowires are configured for inserting and removing lithium ions during battery cycling. The capacity of at least about 1500 mAh/g is maintained after 20 cycles. In this or other embodiments, the capacity of silicon containing nanowires is at least about 600 mAh/g after 100 cycles.

In certain embodiments, the nanowires include a core and a shell. The material of the core is different from the material of the shell. The core includes a conductivity enhancement component, such as a carbon containing material, a silicide, or a carbide. In some embodiments, the nanowires include a core and two or more shells. The material of the core is different from the material of the innermost shell. Further, materials of any two adjacent shells are different.

The nanowires may be doped with one or more dopants. Dopants serve as conductivity enhancement components. In certain embodiments, a dopant includes one or more group III and V elements of the periodic table. A dopant may have a varying concentration throughout the nanowires. For example, the concentration may be higher near the outer surfaces of the nanowires than near the centers.

Nanowires are generally elongated structures. In certain embodiments, nanowires have an average aspect ratio of at least about 100 in a fully discharged state. An average cross-section dimension of the nanowires may be between about 1 nanometer and 300 nanometers in a fully discharged state. In certain embodiments, an average cross-section dimension of the nanowires is such that a fracture limit caused by swelling is not reached at the maximum charge level.

The nanowires may have an average length of at least about 100 micrometers in a fully discharged state. Nanowires may form a layer that is a part of the lithium ion battery electrode. Such layer may have porosity of less than about 75 percent. In the same or other embodiments, the layer has an average thickness greater than at least the average length of the nanowires.

In certain embodiments, the nanowires include materials, such as germanium, tin, tin oxide, or titanium oxide. The conductive substrate may include stainless steel, copper, or titanium.

Electrodes containing nanowires may be used in a lithium ion battery. In certain embodiments, the battery includes a negative electrode with a conductive substrate and silicon containing nanowires growth-rooted to the conductive substrate, a positive electrode, and a lithium ion transporting medium positioned between the negative electrode and the positive electrode. The negative electrode may be configured for inserting and removing lithium ions during battery cycling while maintaining capacity of at least about 1500 mAh/g after 20 cycles. The nanowires may include a conductivity enhancement component for reducing electrical resistance of the nanowires.

Also provided is a method of manufacturing an electrode for use in a lithium ion battery. In certain embodiments, the method includes providing a conductive substrate and forming silicon containing nanowires growth-rooted to the conductive substrate. The nanowires are configured for inserting and removing lithium ions during battery cycling while maintaining capacity of at least about 600 mAh/g after at least 100 cycles. The nanowires may be first formed without a conductivity enhancement component and then treated to introduce the conductivity enhancement component into the nanowires. In certain embodiments, the conductivity enhancement component includes boron, aluminum, or gallium. The conductive substrate may be copper, stainless steel, or titanium.

BRIEF DESCRIPTION OF THE DRAWINGS

FIGS. 4A-C illustrate different examples of nanostructure interconnections.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known process operations have not been described in detail to avoid obscuring the present invention. While the invention will be described in conjunction with the specific embodiments, it will be understood that it is not intended to limit the invention to the embodiments.
Introduction In rechargeable electrochemical cells, charge carrying ions (i.e., electrochemically active ions or, simply, active ions) are transferred between two electrodes. In one half-cycle, these ions are removed from one electrode and inserted into another electrode. Cell performance depends on how many ions can be inserted and removed for a given size and weight of the electrode, how fast the insertion and removal process can be performed, and how many cycles the electrodes can go through without substantially losing their initial properties, among other characteristics. Electrodes include one or more components, such as active materials, additives, and substrates, that are responsible for achieving and maintaining these properties.

For the purposes of this application, an "active material" is defined as an electrode's component that provides ion insertion sites. Each electrode in an electrochemical cell has at least one corresponding active material. In traditional lithium ion cells, a cathode active material is generally lithium cobalt oxide powder, lithium iron phosphate, etc., while an anode active material is generally graphite powder. In certain embodiments of the present invention, active materials are formed into nanostructures, such as nanowires and include one or more of the following components: silicon, germanium, tin, tin oxide, and titanium oxide.

An "active layer" is an electrode layer that contains an active material and, generally, does not include a substrate. However, in some cases, the boundary between the active layer and the substrate is not sharp or abrupt. This may be the case, for example, where the substrate is or includes a mesh or foam. In certain embodiments, a conductive substrate may abut one or two active layers of the electrode. For example, an active material may be deposited as nanowires onto a metallic foil forming an active layer in the contact with the metallic foil. In other embodiments, an active layer may intertwine with a substrate, such as mesh substrate or a substrate that is reconfigured after nanowires deposition. An active layer may also contain other components that are not active materials, such as conductive additives and binders, collectively referred to as "additives."

Figure 1A:
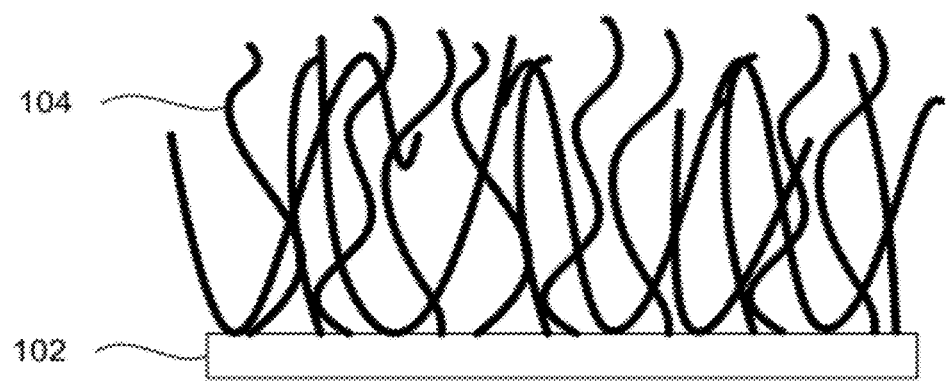
FIGS. 1A-E illustrate examples of substrate rooted and non-rooted nanostructures in accordance with different embodiments.

The term "substrate-rooted" is used herein to describe structures illustrated in FIGS. 1A-1D having nanostructures, such as nanowires, (104, 106, 108, and 110) that are physically and conductively attached to a substrate 102, which may serve as a current collector for an electrode. The nanostructures 104 may be rooted to the substrate 102 at random locations on the structure's profiles (randomly rooted), as shown in FIG. 1A, or rooted preferentially at some particular location on the nanostructures (non-randomly rooted). Examples of non-randomly rooted nanostructures include terminally rooted nanostructures (106 and 110), shown in FIGS. 1A and 1D, and medially rooted nanostructures 108 shown in FIG. 1C. Terminally rooted nanostructures (106 and 110) are preferentially affixed to the substrate 102 at a terminal or distal end of the structures. This assumes that the nanostructures have (in general) some principal dimension that is longer than other dimensions of the structures. As explained below, many different nanostructures are contemplated, many of which will have terminuses or ends (and therefore be capable of terminal rooting). Prominent examples include nanowires and nanorods, which may have aspect ratios greater than one, or more specifically, greater than four.

Figure 1B:
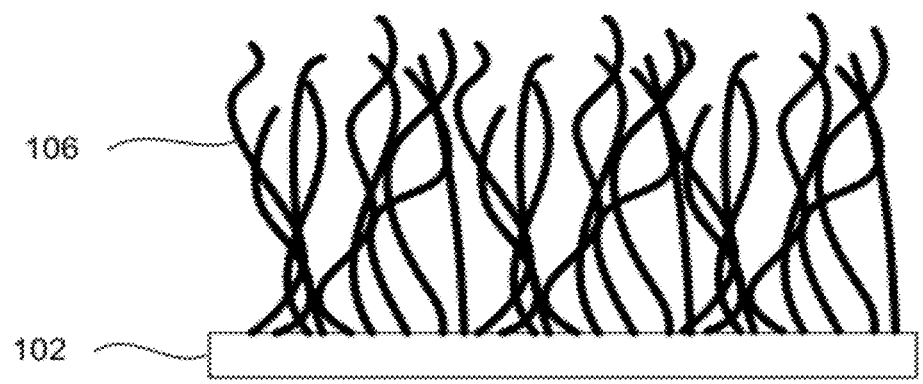
Figure 1C:
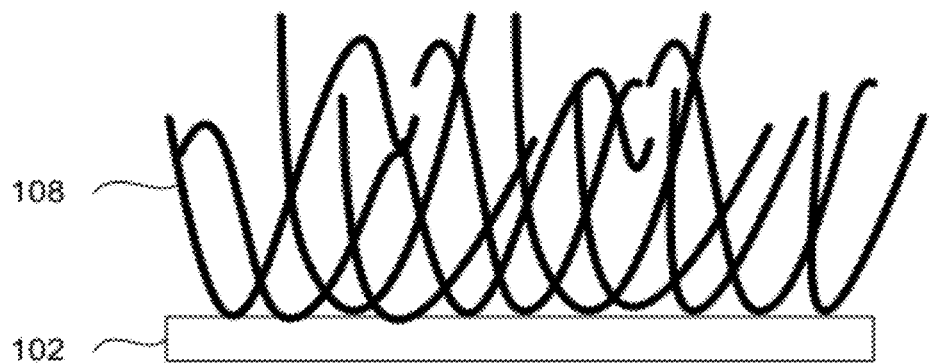
Figure 1D:
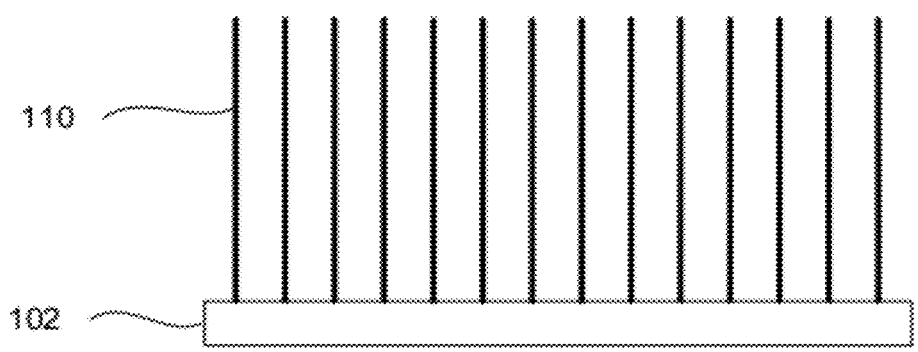
Figure 1E:
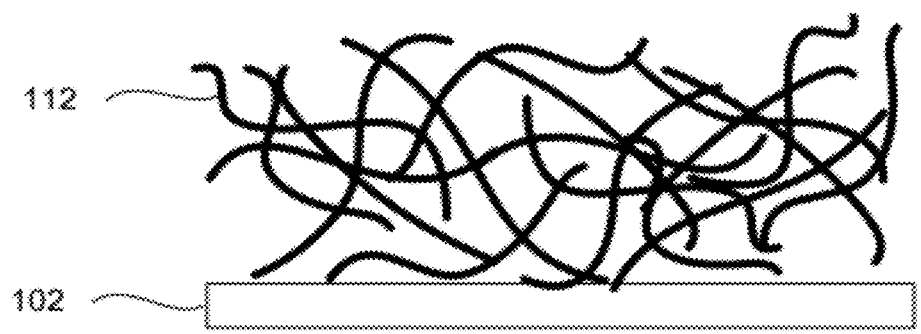

Medially rooted nanostructures 108 are preferentially affixed to the substrate 102 at medial position (rather than a terminal position) on the nanostructures' profiles as shown in FIG. 1C. Non-randomly rooted nanostructures need not have all the nanostructures or even nearly all of the nanostructures affixed to the substrate at the same relative location (e.g., a terminus or a particular medial position). However, they will on average have a higher fraction of the nanostructures rooted to the substrate at this particular location than would be accomplished if the nanostructures were attached to the substrate in a purely random fashion. On the other hand, non-rooted nanostructures 112 will on average have a higher fraction of the nanostructures that are not rooted to the substrate as shown in FIG. 1E. For example, nanostructures may be mixed with a binder to form slurry that is coated to the substrate. Most typically, a higher fraction of the nanostructure will not be in direct contact with or rooted to the substrate.

The unconnected or free ends of non-randomly rooted nanostructures may be aligned in a common direction (e.g., aligned nanostructures 110 shown in FIG. 1D) or may be randomly aligned (e.g., random terminally rooted nanostructures 106 shown in FIG. 1B). For example, aligned terminally rooted nanowires 110 may be aligned in a common direction with respect to the substrate 102, such as orthogonally to the substrate surface at the point of attachment as shown in FIG. 1D. Alternatively, the aligned terminally rooted nanowires may be aligned generally at an angle of 30 degrees from the normal, 45 degrees from the normal, and other angles (not shown). Many other non-random orientations are possible; e.g., curved or zig-zagged.

The substrate 102, as explained more fully below, may be any appropriate shape. However, it will often be desirable to employ relatively flat or planar substrates that can serve as or easily attach to a current collector substrate used in a battery or fuel cell electrode. In alternative embodiments, substantially non-planar substrates, such as spheres, cones, arcs, saddles, and the like, may be employed. Typically, the application and/or method of fabrication will dictate the shape of the electrode.

Frequently the substrate will be of macroscopic dimensions, such that many nanostructures attach to a single common substrate surface. While the substrate may be continuous as in the case of a foil or plate, other substrate morphologies will be appropriate in some situations. Such alternative substrates include mesh substrates, perforated sheet substrates, foam substrates, felt substrates, and the like.

Typically, though not necessarily, the substrate will be conductive, having a conductivity of at least about $10^3$ S/m, or more specifically at least about $10^6$ S/m or even at least about $10^7$ S/m. This may be desirable when the substrate rooted structure is employed as a fully fabricated electrode for a battery or fuel cell. As explained below, examples of suitable substrate materials include copper, titanium, aluminum, stainless steel, doped silicon, and other materials.

As mentioned, substrate rooted nanostructures (104, 106, 108, and 110) are conductively attached to the substrate 102. This attachment provides a direct path for electron and/or hole transport between the nanostructure and the substrate 102, thereby providing a continuous high conductivity (depending on the materials comprising the nanostructure and substrate) pathway. The path will not require that an electron or hole hop from the nanostructure to the substrate at the point of contact. In general, the nanostructures will be mechanically affixed to the substrate such that they are not removed except by breaking the structure. Thus, substrate rooted nanostructures are not connected to the substrate by elastomeric binder, for example. They may be affixed by various techniques such as pressure bonding, heating or annealing, physical bombardment, growth from the substrate, etc.

It should also be noted that substrate rooted structures may be produced by various techniques. In one class of fabrication techniques, the nanostructures are formed independently and subsequently affixed to the substrate by, e.g., annealing, impact, etc. Such techniques result in attachment rooted nanostructures. Another class of fabrication techniques forms nanostructures directly on the substrate by, e.g., chemical vapor deposition, physical vapor deposition, epitaxial growth, atomic layer deposition, and the like. Such techniques result in growth rooted nanostructures. In certain embodiments, such growth rooted techniques employ a catalytic growth or deposition process in which regions of catalyst on the substrate surface selectively promote growth of nanostructures at or proximate to the regions. A third class of fabrication techniques are the etch rooted techniques. In these examples, regions of a substrate are selected etched away to yield nanostructures protruding above the remaining bulk of the un-etched substrate. Necessarily the etching process terminates prior to etching the whole way through the substrate. As a result, only some the original peripheral regions of the substrate etch away, while the bulk interior of the substrate remains.

The composition of the nanostructures may be the same or different from that of the substrate. Additionally, the composition of the individual nanostructures may be the same or different. In the case of different compositions, some nanostructures will have one composition (e.g., doped silicon) and at least some other nanostructures will have a different composition (e.g., tin, layered carbon-silicon, etc.). In certain embodiments, the substrate is a highly conductive current collector material such as copper, brass, stainless steel, etc. while the nanostructures are silicon or another material having a high capacity for lithium ion insertion.

"Active ions" are defined as ions that are used in an electrochemical cell to transferred charge between the negative electrode and the positive electrode through an electrolyte and participate in electrochemical reactions in at least one of the electrodes. While this description generally refers to lithium ions, it should be understood that any other suitable materials may be used. For example, sodium ions, magnesium ions, potassium ions, and protons may be also used in certain configurations.

Electrodes and particularly their active materials transform during insertion and removal of ions. Active materials accepting ions generally increase in size. The size increase affects porosity, thickness, and other properties of the active layer. Often some of the properties are not reversible. Therefore, properties of active layers are discussed in the context of electrodes that have not gone through any cycling, i.e., newly constructed electrodes are described. For example, in the anode context, the properties of an anode are described before initial insertion of the active ions (i.e., the first charge) unless specifically stated otherwise.

A "discharge state" and a "charge state" refer to two relative charge states of an electrochemical cell that has reached either a lower or an upper cut-off voltage respectively. These cut-off voltages are generally predetermined limits at which further discharge or charge of the cell has been determined to be impractical. The cut-off voltages are usually set based on the cell design and application. For example, a typical lithium ion cells with a graphite anode and a lithium cobalt oxide cathode is cycled between 4.2V (upper cut-off voltage) and 3.0 V (lower cut-off voltage). The cell capacity is determined by the cut-off voltages and generally decreases over the battery life. Usually, the first charge capacity is higher than the first discharge capacity. The difference between the first-charge and the first-discharge capacities indicates that some amount of the active ions remain in the anode in the charged state, which is referred to as irreversible capacity. The ratio of discharge capacity to charge capacity is also referred to as Coulombic efficiency. Discharge-capacity generally decreases with a number of cycles. Further, capacity generally depends on the current that is used to charge or discharge a cell, also referred as rate of charge/discharge or, simply, rate. Increasing rates tend to decrease capacities.

It should be noted that while electrode's active material provides cell's capacity, cell's energy density (e.g., volumetric or gravimetric capacity) may be specified with reference to many different cell components, such as active material, active layer, electrode, or. Unless otherwise specified, the capacity values presented in this document are for structures containing active materials, such as nanowires, that form an active layer. For example, gravimetric capacity value would be based on the active materials, conductivity enhancement agents that are parts of the nanostructure (e.g., dopants).

In certain embodiments, the gravimetric first cycle discharge capacity of the nanowires is at least about 1500 mAh/g, or more specifically at least about 2000 mAh/g, even more specifically at least about 2500 mAh/g, or at least about 3000 mAh/g, or at least about 3700 mAh/g. In the same or other embodiments, the gravimetric tenth cycle discharge capacity of the nanowires is at least about 500 mAh/g, or more specifically at least about 1000 mAh/g, even more specifically at least about 1500 mAh/g, at least about 2000 mAh/g, at least about 2500 mAh/g, or at least about 3000 mAh/g, or 3500 mAh/g. The above cell capacity values may be defined for certain cell operating regimes that may be characterized by, e.g., cut off voltages, current rates. In certain embodiments, the above cell capacities are specified for cut of voltage of about 150 mV, 100 mV, 50 mV, and 10 mV at between about 0.1 C and 0.5 C discharge rate.

Electrode Structure

Many embodiments described herein correspond to both cathodes and anodes. For clarity and concision, the references are primarily made to anodes. It will be understood that cathode designs are generally concerned with similar issues of ions insertion/removal, swelling, electric conductivity, ionic mobility, and others. Therefore, many design approaches described herein are applicable to cathodes as well.

Figure 2A:
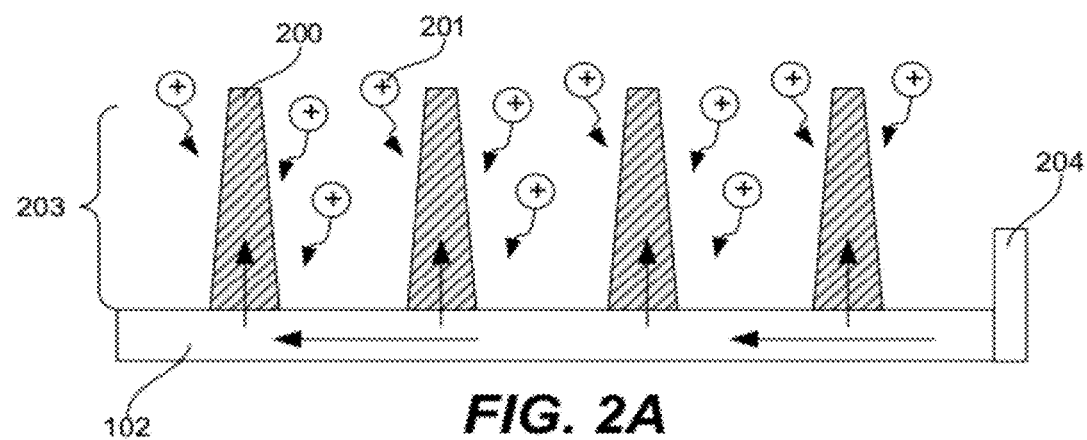
FIGS. 2A-B illustrate an anode example that includes nanostructures in contact with a substrate in discharge and charge states during initial cycling.
Figure 2B:
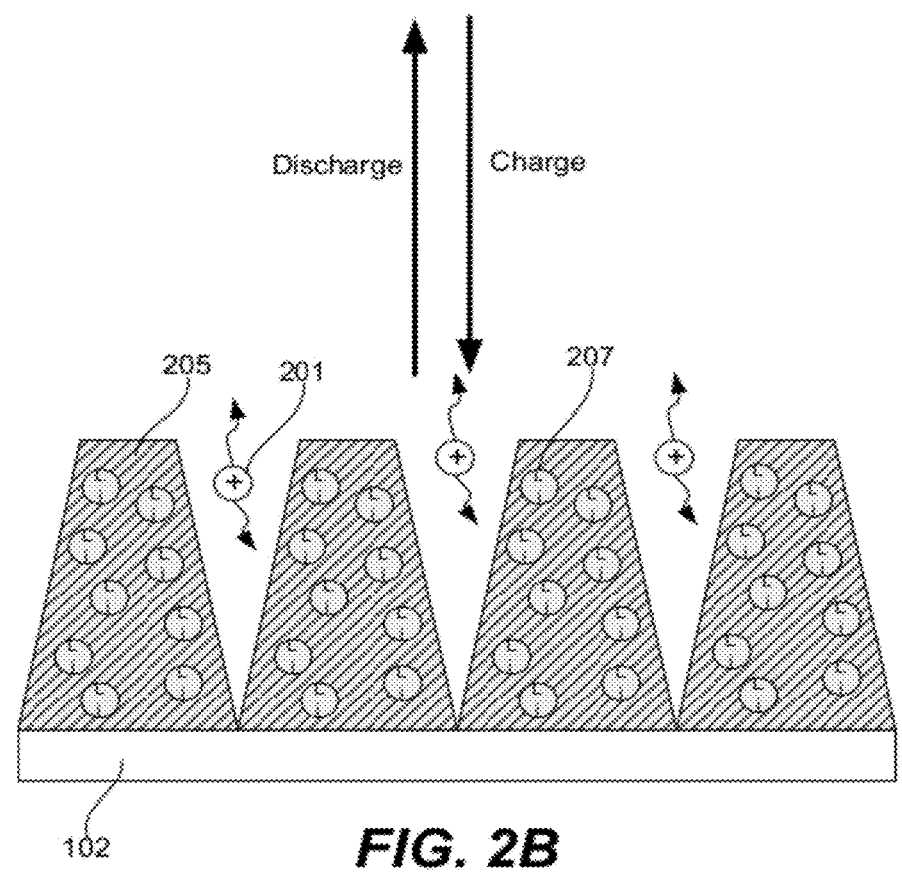

FIG. 2A illustrates an anode example that includes nanostructures 200 in contact with a substrate 102. The nanostructures 200 contain active material for insertion/removal of lithium ions 201 during charging/discharging. The nanostructures form an active layer 203 over the substrate 102. In certain anode embodiments, insertion of active ions 201 into nanostructures transforms the discharged nanostructures 200 shown in FIG. 1A into the charged nanostructures 205 shown in FIG. 2B. Note that active ions are typically receive electrons and are converted into charged equivalents 207 of the active ions. For example, in lithium ions cells, lithium ions are converted to lithium atoms in the anode. In a similar manner, the removal of lithium ions 201 from the charged nanostructures 205 transforms them into the discharge nanostructures 200. Changes in the size of the nanostructures presented in FIGS. 2A-B are for illustrative purposes only. Generally, materials increase in size, i.e., swell, due to insertion of other materials into original structures whether though intercalations, alloying, chemical reactions, or any other method of insertion. Materials having high capacities, i.e., capable of accepting many ions per unit mass or volume, tend to exhibit more swelling. One of the challenges in electrode design is to allow for this swelling without substantial destruction of the electrode structure and losses of cell performance.

In certain embodiments, the current collection substrate 102 is a conductive material suitable for the corresponding electrode. Substrate materials for electrodes used in various lithium ion cells may include copper and/or copper dendride coated metal oxides, stainless steel, titanium, aluminum, nickel (also used as a diffusion barrier), chromium, tungsten, metal nitrides, metal carbides, carbon, carbon fiber, graphite, graphene, carbon mesh, conductive polymers, or combinations of above including multi-layer structures. It will be understood by one having ordinary skills in the art that selection of the materials also depends on electrochemical potentials of the materials. The substrate material may be formed as a foil, films, mesh, laminate, wires, tubes, particles, multi-layer structure, or any other suitable configurations. For example, the substrate 102 may be a stainless steel foil having thickness of between about 1 micrometer and 50 micrometers. In other embodiments, the substrate 102 is a copper foil with thickness of between about 5 micrometers and 30 micrometers.

Certain parameters and design considerations may drive selection of materials, morphologies, structural configurations of the substrate, e.g., tensile strength, Young's module, shear strength, surface roughness, surface activities, surface morphology, melting temperature, density, galvanic potential, passivation properties, cost, contact resistance, bonding compatibility with other metals, welding compatibility with different methods such as ultrasonic, resistance, and laser welding.

In some embodiments, a mesh can be used as a substrate. Meshes are generally characterized by a wire diameter, opening size, overall thickness, and weave type. For example, meshes having a wire diameter of between about 50 nm and 500 μm and an opening size of between about 50 nm and 500 μm may be used. Various weave types may be used, in particular ones that are expandable and can easily change configuration during battery cycling in order to minimize fluctuation of the overall electrode thickness and, maintain pressure to the nanostructures during full discharge to ensure electrical connectivity between various components of the electrode.

Substrates may have various degrees of roughness. Rough substrates, e.g. Ra of between about 1 micrometer and 50 micrometer, may be used to randomize the directions of nanostructure's orientation and to provide overlapping between the nanostructures (e.g., nanowires) in the active layer. Additionally, substrate roughness generally provides more surface area available for attachment of nanostructures leading to a higher volumetric density of active nanostructures.

Rough surfaces may be achieved during substrate formation or during subsequent processing. For example, the surface roughness (Ra) of electroplated copper foil is generally between about 1 micrometer and 10 micrometers. Rolled copper foil has much lower roughness, generally less than 1 micrometer. Smooth surfaces may be roughened using various techniques, such as etching, blasting, polishing. In certain examples, the substrate may be patterned or textured with channel-like structures, where the nanostructures extend from the surfaces of the channels towards each other. The nanostructures may also form connections between the two opposite surfaces of the same channel.

Electrical conductivity is another driver in substrate selection. Generally, conductive substrates are used in order to reduce the overall cell impedance. However, in some embodiments, electrically non-conductive materials may be used for the substrate 102. Such materials may be used for mechanical support and/or for insulating the active layer 203 of one electrode from another. In this instance, the electrical current flows through the active layer 203, which should, itself have high electrical conductivity. To this end, nanostructures may be interconnected, as further discussed below. In certain specific embodiments, an electrically non-conductive substrate may also function as a separator and provide a flow of lithium ions (i.e., provide ionic conductivity) between corresponding active layers of the anode and cathode.

In the embodiments where a substrate 102 (conductive or non-conductive) is used, one or two active layers 203 are deposited onto the substrate 102. One-sided electrodes (i.e., only one active layer and the substrate is exposed on the other side, as shown in FIG. 1A) or one-sided portions of electrodes are typically used only where a corresponding active layer of another electrode does not exist (an outer wind of a jellyroll, external electrodes of a stack, etc.). In some examples, the substrate 200 and the active layer 203 are intertwined. For example, a mesh substrate may exist within a single active layer 203.

In other embodiments (not shown), the electrode does not include a substrate. Both the mechanical support and electrical conduction functions are carried by the active layer 203. For example, silicon nanostructures shaped as wires may form an intertwined mesh that has suitable mechanical strength and electrical conductivity to be used without a substrate. Sometimes mechanical support may be provided by other cell elements, such as a separator, another electrode, a casing, etc.

An electrode may include one or more current collectors 204 that provide electrical connection between the electrode and a cell terminal. If an electrode uses a conductive substrate 102, the current collector 204 is typically attached directly to the substrate 102, for example as shown in FIG. 1A. The collector 204 may be attached to the substrate 102 by ultrasonic welding, resistance welding, laser welding, a mechanical fastener (e.g., a crimp), a conductive adhesive, or any other suitable form of attachment. Alternatively, the collector 204 may be a part of the substrate 102. If a conductive substrate is not used (i.e., a non-conductive or no substrate design), then the collector 204 may integrated directly into the active layer 203. For example, the collector 204 may be crimped over a part of the active layer 203. In some embodiments, the current collector 204 may also serve structural functions. For example, a current collector 204 may form a rigid mandrel onto which a jellyroll is wound. In the same or another example, a casing may be used for conducting electrical current to one of the cell electrical terminals.

The nanostructures 200 may have different shapes and be arranged in different ways within the active layer 203. Several illustrative embodiments are presented in FIGS. 2A-B. One of the shapes is now described in more details. It should be understood that the following description is not limited in all respects to this shape. FIG. 1A shows one example of the nanostructures 200 having elongated tapered shapes with wider ends 207 growth rooted into the substrate 102. Such structures may be formed, for example, using a CVD process over a substrate deposited with a catalyst.

Anode nanostructures may swell during charging. Silicon has been reported to swell by as much as 400% causing pulverization that negatively impacts electrode resistance and capacity. Anode designs based on smaller silicon particles require substantial quantities of binding and conductive media also negatively affecting capacity, and other performance criteria and do not solve the conductivity problem. Further, insulating SEI layers are formed around breakages and cracks resulting in a poor cycle life and high irreversible capacity losses. It has been found that depositing active materials having certain nano-scale dimensions and shapes may help reducing internal stresses during lithiation below the fracture limits while retaining desirable mechanical and electrical properties. These materials are generally referred to in this description as nanostructures. Additional improvement may come from certain configurations of the nanostructure in the active layer 203 and composition of the nanostructures. These parameters will now be discussed in details.

In certain embodiments, nanostructures 200 define an active layer 203 having certain properties, such as thickness and porosity. Porosity of an active layer is a measure of void spaces to the overall volume to the layer before the first cycle of the cell. For example, porosity of an anode is determined before any insertion of lithium ions occurs. It can be expressed as a percentage of the void volume to the total volume. In certain embodiments, the porosity of the active layer is at least about 10%, or more specifically at least about 20%, at least about 30%, at least about 40%, at least about 50%, or at least about 60%. In even more specific embodiments, the porosity may be at least about 75%, or more specifically at least about 90%. Greater porosity may allow more swelling of the nanostructures during cycling.

The thickness of the active layer 203 may change during cycling. Swelling of the nanostructures may exceed the porosity of the active layer causing the layer to expand. Additionally, certain arrangements of the nanostructure may cause the active layer to increase its thickness even though some void space remains in the layer. An active layer may change its thickness by no greater than 100%, or more specifically by no greater than 50%, between charge and discharge states.

Figure 2C:
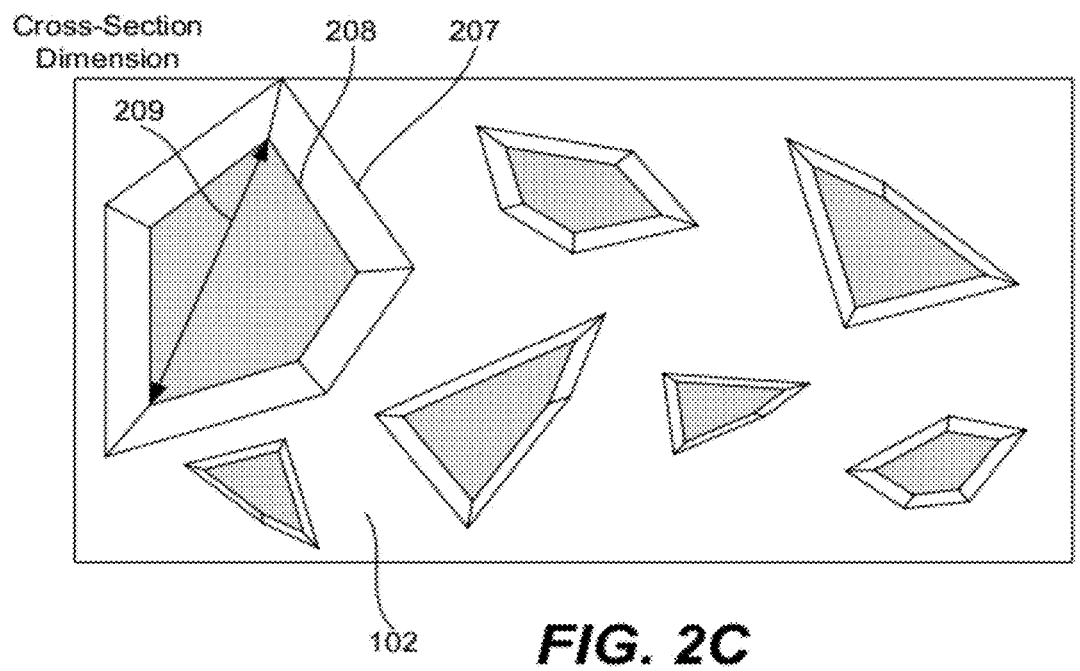
FIG. 2C illustrates a top schematic view of an electrode example showing cross-sectional profiles of nanostructures.

FIG. 2C is a top schematic view of an electrode illustrating different cross-section shapes and dimensions of the nanostructures 208. In certain embodiments, nanostructures have one dimension that is substantially larger than the other two. The largest dimension is referred to as a length. Some nanostructures, especially ones with high aspect ratios, may have curved shapes. In these cases, the length of the nanostructure is the length of the representative curve. A cross-section is defined as a profile of a nanostructure in a plane perpendicular to the length. Nanostructures may have many varying cross-sectional (transverse) thicknesses along their lengths. Further, an active layer may have nanostructures with different cross-sections, both shapes and dimensions. For example, FIG. 2C illustrates cross-section examples of the tapered nanostructures 208. For these nanostructures, the cross-section near the substrate-rooted end 207 is greater than near the free end. Examples of nanostructure shapes include spheres, cones, rods, wires, arcs, saddles, flakes, ellipsoids, etc.

Cross-sectional shapes are generally dependent on compositions, crystallographic structures (e.g., crystalline, amorphous), sizes, deposition process parameters, and many other factors. Shapes may also change during cycling. Irregularities of cross-sectional shapes require a special dimensional characterization. For the purposes of this application, a cross-section dimension 209 is defined as a distance between the two most separated points on a periphery of a cross-section that is transverse to the principal dimension, such as length. For example, a cross-section dimension of a cylindrical nano-rod circle is the diameter of the circular cross-section. In certain embodiments, a cross-section dimension of nanostructures is between about 1 nm and 10,000 nm. In more specific embodiments, a cross-section dimension is between about 5 nm and 1000 nm, and more specifically between 10 nm and 200 nm. Typically, these dimensions represent an average or mean across the nanostructures employed in an electrode.

In certain embodiments, nanostructures are hollow. They may be also described as tube or tube-like structures. Therefore, the cross-sectional profile of these hollow nanostructures includes void regions surrounded by annular solid regions. An average ratio of the void regions to the solid regions may be between about 0.01 and 100, more specifically between about 0.01 and 10. The cross-section dimension of the hollow nanostructures may be substantially constant along the principal dimension (e.g., typically the axis). Alternatively, the hollow nanostructures may be tapered along the principal dimension. In certain embodiments, multiple hollow nanostructures may form a core-shell arrangement similar to multiwall nanotubes.

Figure 2D:
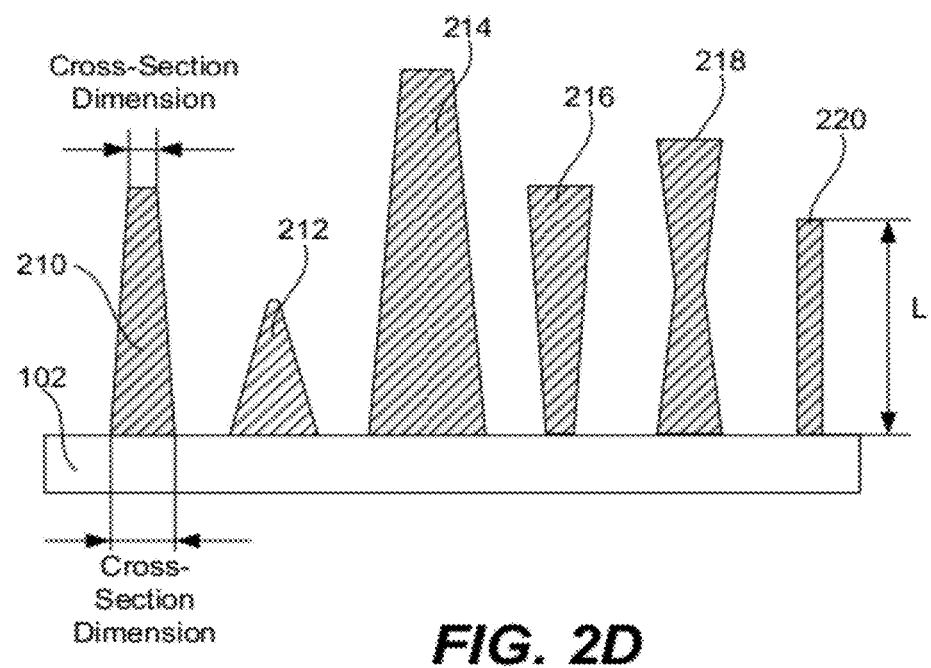
FIG. 2D illustrates a side view of nanostructure examples showing different side profiles and dimensions.

The cross-section dimension may vary along the length of nanostructures. FIG. 2D illustrates side profile examples of nanostructures in accordance with certain embodiments. Unless otherwise specified, a cross-section dimension of a nanostructure refers to an average cross-section dimension along the entire length of a nanostructure. The cross-section dimension may vary along the length in a variety of different ways. FIG. 2B shows nanostructures 210 and 212 with the substrate rooted ends having larger cross-section dimensions than the free ends. Such tapering may result from gradual catalyst exhaustion and side-wall growth during the deposition. For example, the catalyst may evaporate because of high temperatures, e.g., at least about 500° C. for a gold catalyst, used during the deposition. Another example may be a tapered nanostructure 216 with the substrate-rooted end having a smaller cross-section dimension than the free end. In some embodiments, a nanostructure 218 has a narrow neck somewhere along the length and tapers from this neck towards both ends. For example, such shapes may be achieved by varying precursor flow rates and other process parameters. An average taper for the entire length of the nanostructure may be less than 10 degrees and more specifically even less than about 5 degrees.

Nanostructures can also differ in length. Often it is helpful to describe nanostructures in terms of their aspect ratio, i.e., a principal dimension divided by a cross-section dimension.
Wire-Shaped Nanostructures In certain embodiments, a "nanowire" is defined as a structure that has, on average, an aspect ratio of at least about four. In certain examples, the average aspect ratio may be at least about ten, at least about one hundred, or even at least about one thousand. In some cases, the average nanowire aspect ratio may be at least about ten thousand, and can even reach about one hundred thousand. Nanowire active materials can undergo substantial swelling without disrupting the overall structure of the active layer, provide better electrical and mechanical connections with the layer, and can be easily realized using the vapor-liquid-solid and vapor-solid template free growth methods or other templated methods.

Figure 3A:
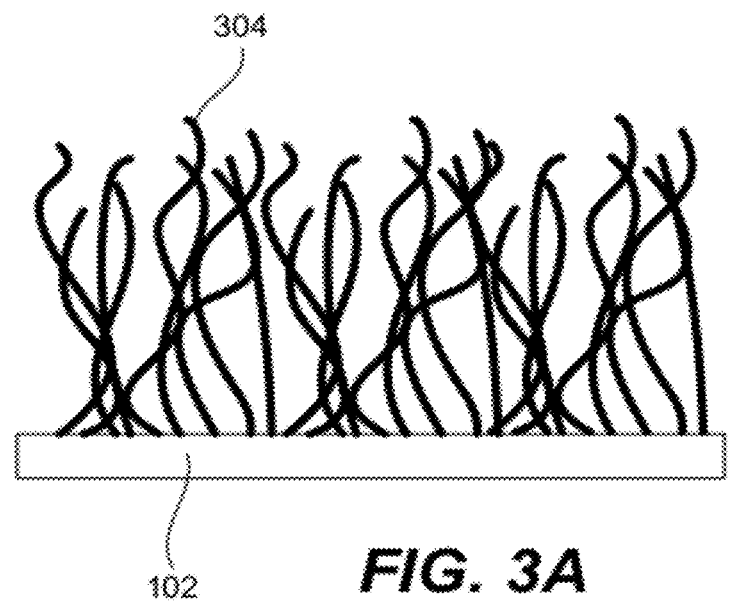
FIG. 3A illustrates an active layer example with growth-rooted nanostructures having wire-like shapes.

Nanowires can be terminally rooted to the substrate to form an active layer 304 as illustrated in FIG. 3A. These type of nanowires 304 may be formed by any of a number of techniques. Growth rooted nanowires may be deposited using, e.g., a catalyst coated substrate that provides deposition sites for the nanowires. Interconnection between the nanowires and the substrate generally provides good electrical conductivity and allows, in certain embodiments, an active layer with no or very little binder. For example, a conventional anode in a lithium ion cell uses approximately 10-12% of binding material based on solvent-free weights of all active layer components. The active layer 105 in accordance to certain embodiments of the present invention includes less than about 5%, or more in more specific embodiments less than about 2%, of binding materials.

Figure 3B:
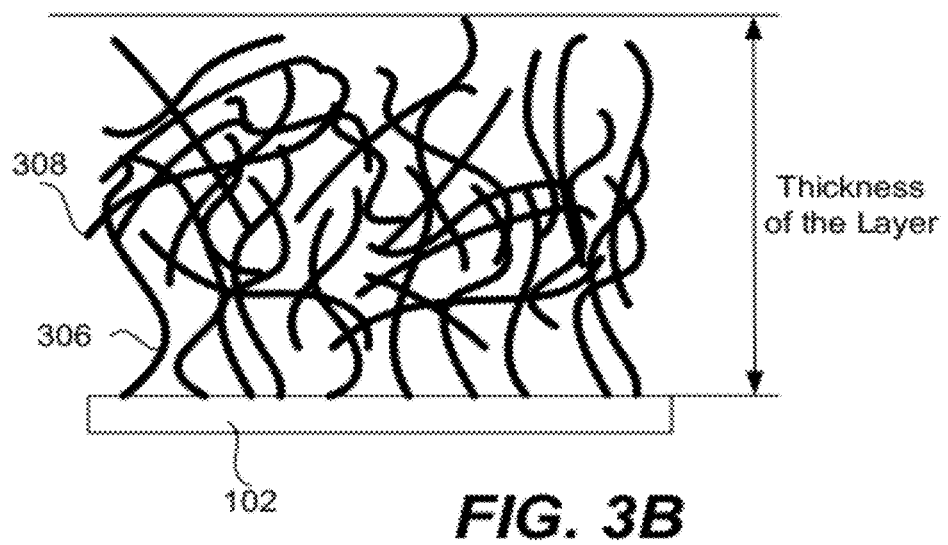
FIG. 3B illustrates an active layer example with partially growth-rooted nanostructures having wire-like shapes.

Sometimes a single layer of the nanostructures that are rooted onto the substrate may not provide adequate thickness of the active layer. For example, a high capacity application may require thickness of an active layer that is greater than the average lengths of the nanowires. Further, nanowires may curve and form acute angles with the substrate causing the thickness of the active layer to be less than an average length of the nanowires. One way to address this issue is to form multiple sub-layers of nanowires to form a single active layer. FIG. 3B illustrates an active layer example with partially growth-rooted nanostructures having wire-like shapes. Some nanostructures 306 of the active layer may be rooted to the substrate 102, while others 308 may not have direct contact with the substrate. Non-substrate rooted nanostructures 308 may be interconnected with substrate-rooted nanostructures 306 through direct (e.g., metallic) bonds or additives. In certain embodiments, such layer may be formed first by creating substrate-rooted nanostructures 306, for example using CVD. New nucleation points may then be created on the substrate-rooted nanostructures 306 by additional deposition of the catalysts on the deposited nanowires using sputtering or other deposition techniques or re-deposition of the catalyst remaining from the substrate rooted growth. The deposition can then continue by forming secondary nanostructures 308 (e.g., nanowires) over the growth-rooted ones 306. Secondary nanostructures 308 are indirectly coupled to the substrate 102 via the primary, substrate-rooted nanostructures 306. In certain embodiments, the coupling between structures 306 and 308 is a direct electronic connection that allows electrons or holes to flow unimpeded between the structures. Because the nanostructures 306 may be substrate rooted to substrate 102, a highly conductive pathway exists between distal regions of structures 308 and substrate 102. This tight electrical coupling among electroactive nanostructures comprising the active layer allows for electrode designs requiring relatively little conductivity enhancing additives such as carbon.

In alternative embodiments, secondary nanostructures 308 may be connected to the substrate-rooted sub-layer or directly to the substrate using binders. In certain embodiments, an active layer may include between about 2 weight percent and 25 weight percent of one or more binders based on a solid content of the layer, or more specifically between about 5 weight percent and 10 weight percent. Binders may be soluble in aqueous or non-aqueous solvents, which are used during fabrication. Some examples of "non-aqueous binders" include poly(tetrafluoroethylene) (PTFE), poly(vinylidene fluoride) (PVDF), styrene-butadiene copolymer (SBR), acrylonitrile-butadiene copolymer (NBR) or carboxymethyl cellulose (CMC), polyacrylic, and polyethylene oxide, and combinations thereof. Examples of "aqueous binders" include carboxymethyl cellulose and poly (acrylic acid), acrylonitrile-butadiene copolymer latex, polyacrylamide in combination with carboxylated styrene-butadiene copolymer and/or styrene-acrylate copolymer. In another specific example, the binder may include a fluoropolymer and a metal chelate compound. The fluoropolymer may be polymerized from fluorinated monomers, such as vinyl fluoride (VF), vinylidene fluoride (VdF), tetrafluoroethylene (TFE), trifluoroethylene (TrFE), chlorotrifluoroethylene (CTFE), fluorinated vinyl ethers, fluorinated alkyl acrylates/methacrylates, perfluoroolefins having 3-10 carbon atoms, perfluoro C1-C8 alkyl ethylenes and fluorinated dioxoles.

FIGS. 4A-C show different illustrative examples of interconnecting the nanostructures. Interconnecting improves electrical conductivity of the active layer, provides mechanical attachment eliminating the need of a binder, and allows deposition of thicker active layers. FIG. 4A illustrates an interconnection example in which multiple nanowire fingers 402a-d are grown from a central connection or nucleation site 404. This site may be formed, for example, by a catalyst particle, direct un-catalyzed nucleation, or an irregularity in the crystalline structure. The process may involve, for example, operations of re-depositing the remaining catalyst (or deposition of the new catalyst) after the first batch of the nanowires has been deposited, heat treating the catalyst to form a a plurality of droplets, and incorporating metallic nanoparticles.

FIG. 4B illustrates an interconnected nanostructure having multiple nanostructure fingers where one central nanostructures 406 serves as a backbone to which other nanostructure fingers 408 are attached. For example, the nucleation points 410 may be created along the length of the backbone nanostructure 406 after its deposition. This may be achieved by coating additional catalyst on a layer of deposited nanostructures, for example.

FIG. 4C illustrates an interconnection example among multiple nanostructures 420 using additives 422, for example conductive additives. Conductive additives can include carbonaceous material, such as coke, acetylene black, carbon black, Ketchen black, channel black, furnace black, lamp black and thermal black or carbon fibers, graphite, metallic flakes or particles of copper, stainless steel, nickel or other relatively inert metals, conductive metal oxides, such as titanium oxides or ruthenium oxides, or electronically-conductive polymers, such as polyaniline or polypyrrolein. The amount of conductive additive may be up to about 20 weight percent of the active layer, more specifically between about 1 are 10 weight percent. In the same or other embodiments, the additives 422 include one or more binders described above. Various forms of interconnections can be combined. For example, the direct interconnections presented in FIGS. 4A-B may be supplemented with conductive additives and/or binders.

Groups of nanowires or other nanostructures may form an interconnected bundle, where the nanowires are closely positioned relative to each other along the length of the nanowires. Bundles may be formed when catalyst sites are close to each other on the conductive substrate surface prior to the deposition of the nanowires. Bundles may also be formed after the deposition when the nanowires are forced into the bundles during post-deposition treatment of the active layer. Generally, the individual structures of a bundle will be separated, on average, from one another by no more than about 300% of the average cross-section dimensions of the nanowires in the bundles, more specifically by no more than about 100%, or even more specifically by no more than about 30%.

Bundles may provide improved conductivity of the active layer. Nanowires in a bundle may touch each other along their lengths, and thereby form multiple electrical connections with each other. One or more nanowires in a bundle may be specifically provided to have higher conductivity than the others and thereby help other nanowires that comprise active materials to transfer charge to the conductive substrate. Further, if one or more nanowires in a bundle are separated from the conductive substrate, for example because of breakage, sufficient electrical and mechanical connection of the separated nanowires to the substrate will be provided by other nanowires in the bundles.

Bundles may also be used to provide an expansion volume for the nanowires in the bundle carrying the active material. For example, one or more nanowires in a bundle may keep its original size or even reduce in size when other nanowires expand during lithiation.

Materials

The nanostructures used in anodes may include one or more active materials, such as silicon, germanium, tin, tin oxide, titanium oxide, carbon, a variety of metal hydrides (e.g., $MgH_2$), silicides, phosphides, and nitrides.

While silicon has received much of the attention as a next generation lithium insertion anode material, other materials may also be used with this invention. For example, nanostructures may also include tin. Tin is relatively inexpensive and appears to undergo a smaller volume change than silicon during lithium ion insertion. Tin may be used as a sole active material or in combination with silicon or other materials. For example, tin-doped silicon, tin-coated silicon, silicon-coated tin, tin-silicon alloys, and the like may be used. Tin may also be combined with copper as an alloy (e.g., a bronze). As a lithium insertion material, elemental tin has a capacity of 960 mAh/g.

In other specific embodiments, nanostructures may include germanium. As a lithium insertion material, elemental germanium has a capacity of 1600 mAh/g, but the room-temperature diffusivity of lithium in germanium is about 400 times higher than that in silicon. Therefore, germanium is particularly attractive for high-rate applications. Germanium may be used as a sole active material or in combination with silicon and/or tin. For example, silicon-coated germanium structures, germanium-coated silicon structures, tin-coated germanium structures, germanium-coated tin structures, germanium-doped tin, tin-doped germanium, and the like may be used as in anodes of lithium ion batteries.

Other active materials and combinations of the active materials may include: carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon.

The nanostructures used on cathodes may include one or more active materials, such as various lithium metal oxides (e.g., $LiCoO_2$, $LiFePO_4$, $LiMnO_2$, $LiNiO_2$, $LiMn_2O_4$, $LiCoPO_4$, $LiNi_{1/3}CO_{1/3}Mn_{1/3}O_2$, $LiNi_xCO_yAl_zO_2$, $LiFe_2(SO_4)_3$), carbon fluoride, metal fluoride, metal oxide, sulfur, and combination thereof. Doped and non-stoichiometric variations of these materials may be used as well.

Core-Shell Nanostructures

Figure 5A:
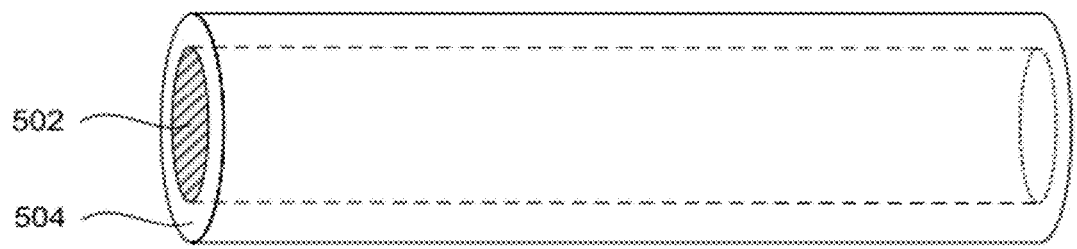
FIGS. 5A-B illustrate core-shell examples of nanostructures in accordance with certain embodiments.
Figure 5B:
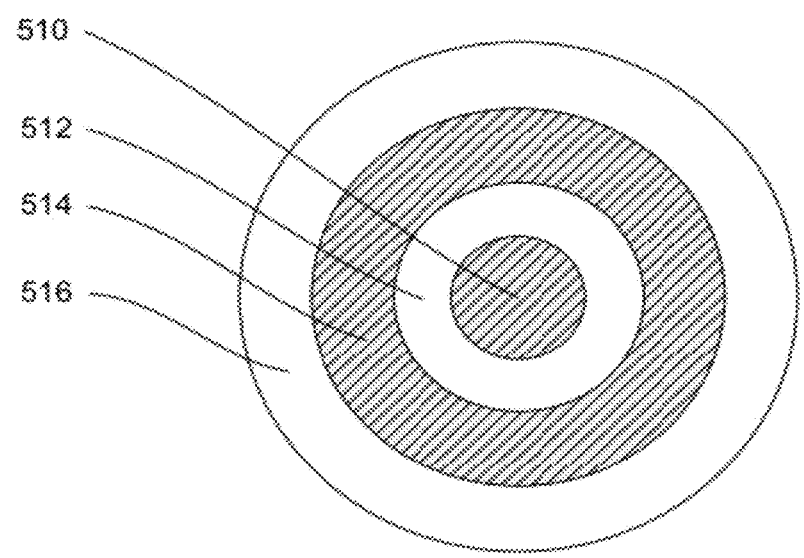

A nanostructure may include different materials (both active and non-active) and distribution of these materials within the nanostructure may vary as well. For example, each material may form its own layer within a nanostructure. FIG. 5A illustrates an example of a nanostructure where one material forms a "core" 502 and another material forms a "shell" 504 around the core. The nanostructure may have multiple shells as illustrated in FIG. 5B. It should be understood that any number of concentric shells may be used. Furthermore, a core may be a hollow (e.g., tube-like) structure. Typically, at least one of the materials in a core-shell is an active material. In one embodiment, a core-shell structure forms nested layers in a rod or wire, where one layer is surrounded by another outer layer, e.g., forming a set of concentric cylinders. In other embodiments, each layer of the nanostructure is a sheet that is rolled around itself and other layers to form a spiral. For simplicity, each of these embodiments is referred to as a core-shell structure.

In general the dimensions and shapes of core-shell nanostructures fall into the same ranges as discussed above for single material nanostructures. In one example, the average cross-section dimension of core-shell nanostructures may be between about 1 nm and 100 μm and more specifically between about 50 nm and 5 μm. The transverse dimension (e.g., thickness or diameter) of each layer may be between about 1 nm and 10 μm and more specifically between about 10 nm and 1 μm. Of course, the thickness of one layer may different from thicknesses of other layer.

The core 502 and the inner most shell 504 are generally made from two different materials or from different structures of the same material. In certain embodiments, the core 502 includes a silicon containing material, while the inner most shell 504 includes a carbon containing material. Carbon has good electrical conductivity, lithium ion insertion properties, and mechanical strength. Carbon shells may be permeable for lithium ions (e.g., 10 nm and 1 μm thick). In certain embodiments, the carbon outer shell represents between about 1 and 5 weight percent of the entire nanostructure composition. Some lithium ions may be inserted into the carbon shell, while others may penetrate through the shell and be inserted into the silicon core. In the embodiments including multiple shells, lithium ions can further penetrate through the layer increasing the effective capacity of the nanostructures.

In certain embodiments, the core 502 includes a carbon containing material, while the shell 504 includes a silicon containing material. The silicon shell may be permeable to some lithium ions. Other materials may serve as the core and shell components of the structures, for example, the ones listed above.

In certain embodiments, the core and shell components include silicides and/or carbides, such as a zirconium carbide. Some of these materials may improve conductivity of the nanowires and may allow the layers of the core-shell nanostructure to expand during lithiation without destroying the overall structure of the nanowire. Some of the proposed materials that can be used in combinations with active materials in the core-shell arrangements may have good conductivity and/or be inert to the active ions in the electrolyte. Some materials, such as carbon, may provide additional lithiation sites and help to increases capacity of the overall nanowire. Amounts of materials in different layers of the core-shell arrangements may be determined based on conductivity, volume expansion, and other design considerations.

Carbon containing layers may be formed using methane, ethane, or any other suitable carbon containing precursors with or without catalysts. The precursors may be passed over nickel, chromium, molybdenum, or any other suitable catalysts and deposit a carbon layer over the catalyst. Carbon shell over silicon core nanostructures may be formed by depositing a catalyst onto the silicon surface (which may be a nanostructure formed by a conventional process). Examples of catalyst include gold, aluminum, tin, indium, lead, iron, nickel, titanium, copper, and cobalt. Carbon precursors are then flowed over the catalyzed silicon substructures to form a carbon layer. Furthermore, a carbon layer may be deposited by burning a natural gas (a combination of methane and other higher hydrocarbons) over a layer of silicon nanostructures. Other methods include coatings using organic media, which are later baked leaving carbon residue. For example, silicon nanowires may be dipped into a glucose or polymer solution. After allowing the solution to penetrate into the nanowire mesh, it is removed from the solution and baked. Glucose leaves carbon residues on the nanowires.

Nanostructures that include both silicon and carbon layers generally have better conductivity than nanostructures containing only silicon, allow additional expansion volume, and reduce stresses associated with swelling inside each nanostructure and between the nanostructures in the active layer. Carbon is a substantially less resistive element ($1.375 \times 10^{-5}$ $\Omega$m for graphite) than silicon ($6.40 \times 10^{2}$ $\Omega$m). The internal resistance of the nanostructures and the contact resistance between the abutting nanostructures can be substantially reduced by including carbon containing materials. Furthermore, carbon containing layers, for example, a graphite layer, can accommodate swelling of adjacent silicon containing layers. Without being restricted to any particular theory, it is believed that an interphase between two layers (e.g. a silicon containing layer and a carbon containing layer) may provide addition insertion points for lithium ions.

Doping

Some active materials, such as silicon, have high theoretical capacities, but also exhibit high electrical resistance. Conductivity can be improved by introducing conductive additives into an active layer. It has also been found that certain materials may also be doped during formation of nanostructure or during treatment of a deposited layer resulting in improved conductivity. For the purposes of this application, any addition of a conductivity enhancement component directly into the nanostructure is referred to as doping regardless of the concentration of the conductivity enhancement component. In certain embodiments, elements from the groups III and V of the periodic table are used as conductivity enhancement components in silicon containing nanostructures. For example, silicon containing nanostructures can be doped with one or more elements from the group consisting of boron, aluminum, gallium, indium, thallium, phosphorous, arsenic, antimony, and bismuth. It has also been found that certain conductivity enhancement components improve charge transfer properties of the active layer. Other dopant atoms besides group III or V atoms may be employed. Examples include sulfur, selenium, etc. Doped silicon has higher electron or hole density in comparison with un-doped silicon (e.g., Fermi level shifts into the conduction or valence band, resulting in higher conductivity).

In certain embodiments, silicon containing anode nanostructures are "doped" with lithium. Such doping helps to compensate for losses of lithium during formation of a solid electrolyte interphase (SEI) layer. It should be understood that a cathode nanostructure may also be doped with lithium. In either case, the lithium is generally considered as distinct from the electrochemically active lithium ions that shuttle between the anode and cathode during cell cycling. The lithium dopant atoms may be inserted during an initial charge or discharge cycle and can be viewed as irreversible capacity loss.

Depending on the concentration of materials introduced into silicon containing nanostructures, the resulting nanostructure may be transformed into a semiconductor (concentration is between about $10^{14}$ and $10^{19}$ atoms per centimeter cubed), a highly doped metalized conductive silicon (concentration is between about $10^{19}$ and $10^{21}$ atoms per centimeter cubed), or a silicon alloy (concentration is greater than about $10^{21}$ atoms per centimeter cubed). Higher concentration is usually desirable for higher conductivity. For the purposes of this application, any foreign material incorporated into base materials of the nanostructure is referred to as a dopant regardless of the concentration. More than one dopant material may be used. In certain embodiments, one or more dopants have concentration of between about $10^{14}$ and $10^{19}$ atoms per centimeter cubed. In other embodiments, one or more dopants have concentration of between about $10^{19}$ and $10^{21}$ atoms per centimeter cubed. In yet another embodiment, concentration is between about $10^{21}$ and $10^{23}$ atoms per centimeter cubed.

Various methods may be used to introduce dopants (i.e., doping) into the nanostructures. For example, a gas phase doping involves introducing dopant containing precursors together with base material precursors, such as silane for silicon nanostructures. Relative flow rates of precursors may vary during deposition to achieve dopant concentration gradients within the nanostructures. For example, a mixture of hydrogen, silane, and about 10 ppm of phosphine may be flowed into the deposition chamber. Silane decomposes at catalyst sites and forms silicon wires. The phosphine similarly decomposes and leaves phosphorus that incorporates into the silicon nanostructures as a dopant by replacing silicon in some lattice sites.

Another method for doping involves spin-on coating. For example, an organic polymer containing dopants may be coated over a layer of deposited nanostructures. The coated nanostructures are then baked at between about 200° C. and 600° C. for between about 20 and 30 minutes. The organic polymer decomposes into gases that are removed from the baking chamber leaving dopant on the nanostructures. Some dopant may diffuse into the nanostructures.

Dopants may also be introduced using ion implantation. This process includes generating dopant ions, accelerating the ions in the electrical field (e.g., 1 to 500 keV), and bombarding a nanostructure layer with the accelerated ions. Some of the dopant ions penetrate into nanostructures. Controlling electrical fields may be used to provide dopant concentration gradients within nanostructures and even to modify morphological structure of the nanostructures.

Another doping method includes evaporating a dopant during the nanostructure formation and trapping some of the evaporated dopant in the newly formed nanostructures. For example, aluminum and indium may dope silicon nanostructures using this method. A temperature range for evaporation may be between about 150° C. and 700° C., depending on the material to be evaporated.

Figure 6:
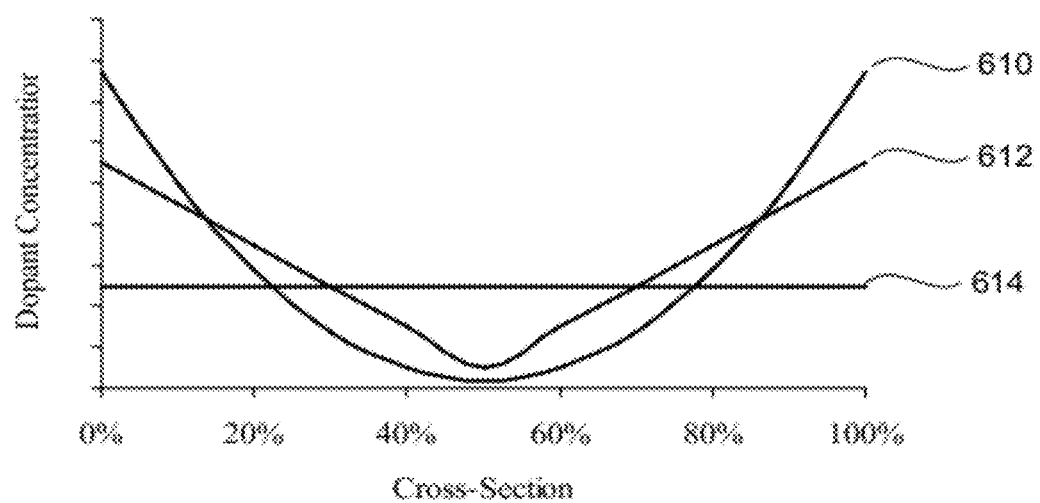
FIG. 6 is an example plot of different illustrative dopant concentration profiles.

In certain embodiments, dopants are evenly distributed throughout the entire volume of the nanostructures, i.e., dopants have a uniform concentration distribution as illustrated with line 614 in FIG. 6. Such uniform distribution may result, for example, from dopants being introduced during deposition of the nanostructures. In other embodiments, dopant concentration may be greater near the outer surface of the nanostructures. Two examples of dopant concentration distributions are illustrated with lines 610 and 612 in FIG. 6. For example, dopants may naturally segregate to the surface when gas phase precursors are used in CVD formation of the active layer containing nanostructures. Also, if the doping operation follows the deposition operation, then the dopants are introduced into the structures from the surface and diffuse into the structures creating a dopant concentration profile that is typically higher around the surface.

Dopants may also be unevenly distributed along the length of nanostructures. For example, nanostructures may have higher dopant concentration resulting in higher conductivity near the growth-rooted ends where the electrical current flow is the highest. Varying dopant concentration may be achieved by varying relative flow rates of dopant-containing precursors during the deposition operation.

Crystalline and Amorphous Structures

Figure 7:
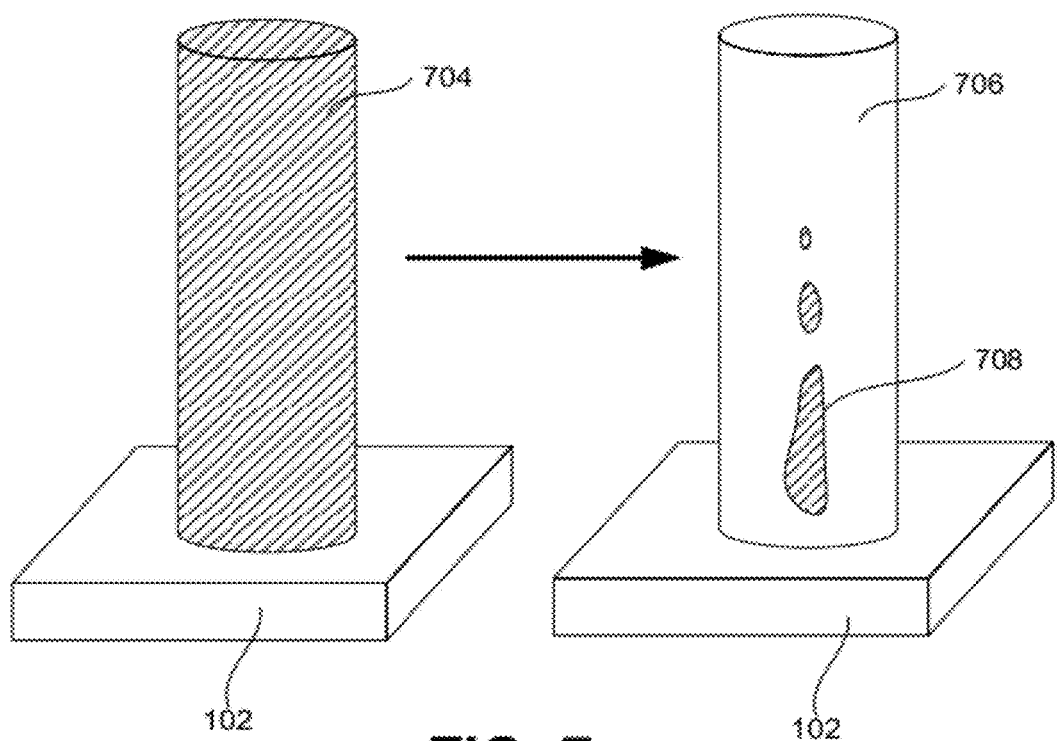
FIG. 7 illustrates transition from a crystalline to an amorphous structure in a nanostructure.

A nanostructure may be deposited as a single crystal, multiple crystals combined together, a predominantly amorphous structure, or a combination of crystals and amorphous structures. Often, initially deposited crystalline structures are later transformed into amorphous structures during initial cycling of the cell. FIG. 7 illustrates an example of a crystalline nanostructure 704 deposited onto the substrate 102. During cycling the nanostructure 704 is transformed into a predominantly amorphous structure 706. The amorphous structure 706 may have a few remaining crystals. Often such transformation corresponds to some capacity loses.

In certain embodiments, the nanostructures are deposited in a predominantly amorphous form. Without being restricted to any particular theory, it is believed that eliminating initial structural transformation helps to reduce initial capacity loss. For example, a silicon layer of the nanostructure deposited over the carbon layer may assume a naturally amorphous state directly upon the deposition, thereby avoiding the need to convert from a crystalline to an amorphous state during an initial cycle. For example, silicon deposited over the surface of a carbon nanostructure (to form core-shell nanostructures) using a thermal CVD or PECVD method may form an amorphous silicon.

Fabrication Methods

Figure 8:
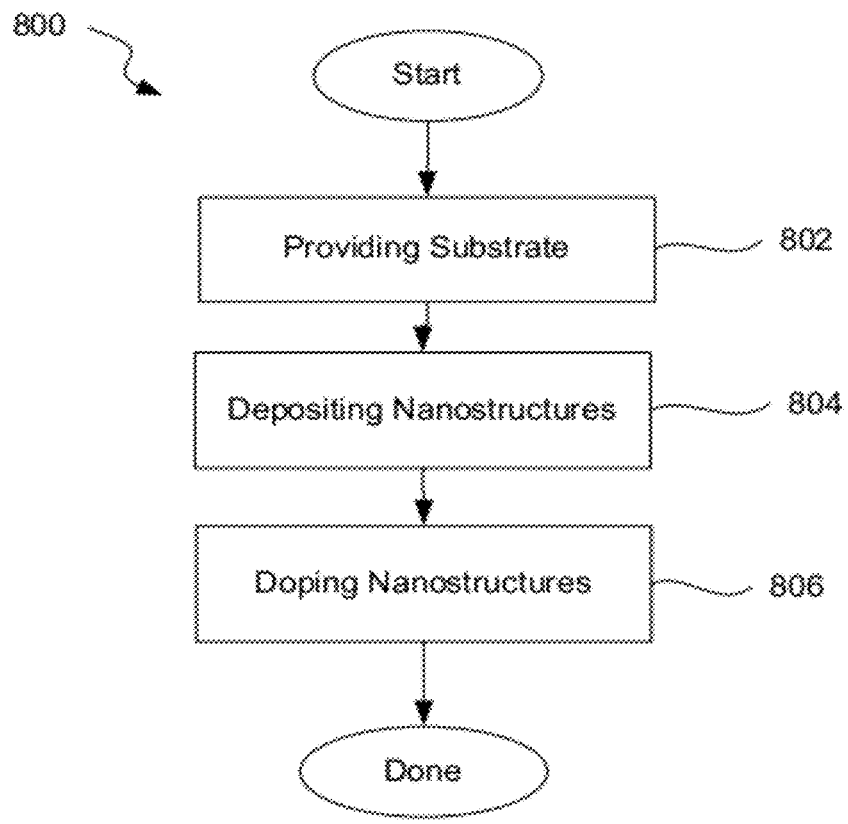
FIG. 8 illustrates an example of a method depositing growth-rooted nanostructures on a substrate.

FIG. 8 illustrates an example of a method for depositing growth-rooted nanostructures in accordance with certain embodiments. The process may starts with providing a substrate (block 802) that could include one or more substrate materials and have one or more structure (e.g., a foil, mesh, particles) described above. The substrate may be specially treated to modify its surface properties, such as roughness and surface resistance. Further, the substrate may be treated with certain precursors to provide improved adherence of the nanostructures to the substrate after deposition. For examples, precursors containing titanium, tellurium, chromium, nickel, and/or copper may be used. Some of these materials may be also used to form a diffusion barrier layer between the catalyst and the substrate to prevent or, at least, inhibit allying of the catalyst material with the substrate material. Selection of the precursors depends on the substrate, material, catalyst, and process parameters. Additionally, the substrate may be processed prior to the deposition as described above (e.g., surface may roughen, patterned, textured, chemically treated) to improve adhesion and other properties of the electrode.

After the substrate has been provided and appropriately treated (if necessary), the substrate may be contacted with a catalyst to form catalytic sites that promote growth-rooted nanostructure formation. Selection of the catalyst usually depends on a targeted composition, shape, and other properties of the nanostructures. A catalyst for depositing silicon nanostructures may be discreet particles or patches or a continuous layer of gold, aluminum, indium, gallium, tin, iron, nickel, titanium, and/or iridium.

Figure 9:
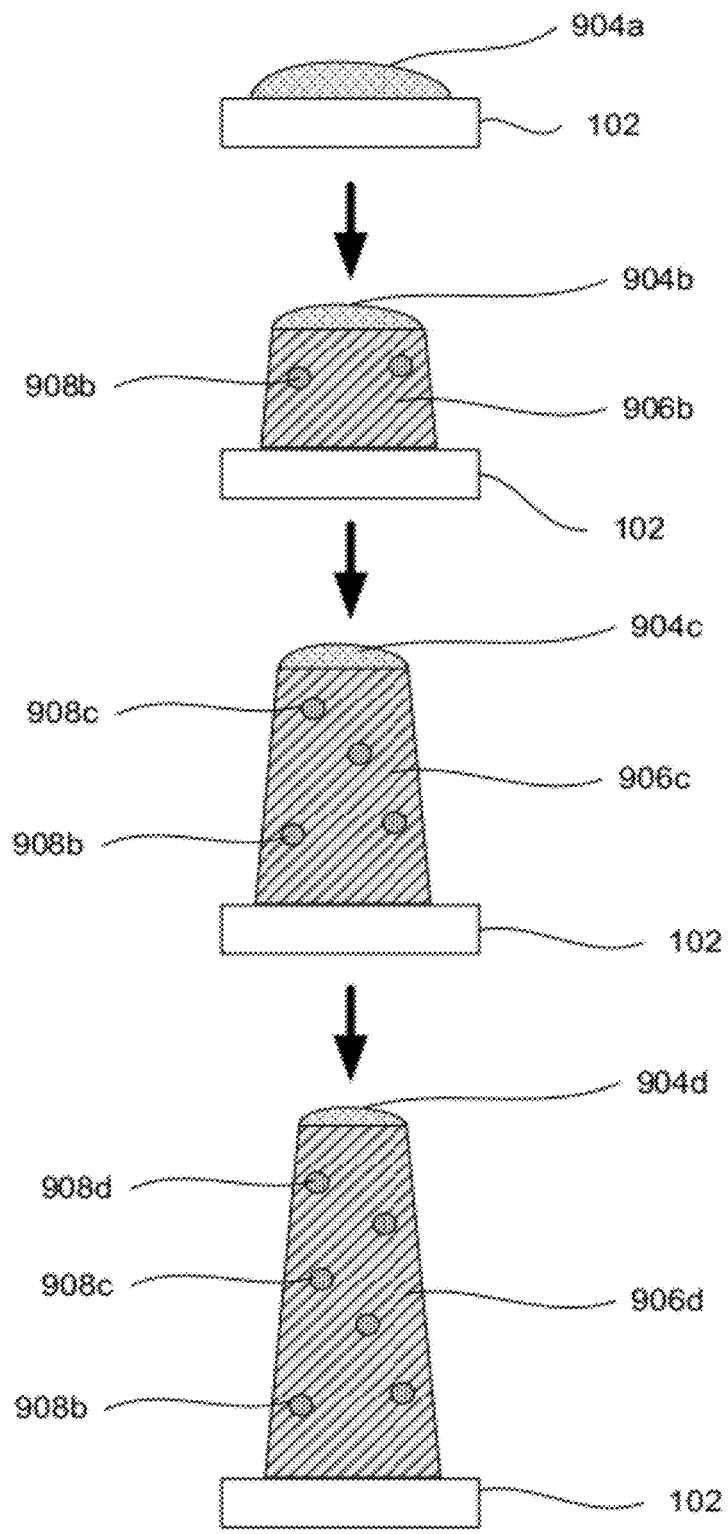
FIG. 9 illustrates an example nanostructure during different stages of the deposition process.

The nanostructures may be then deposited onto the substrate (block 804). For example, in a CVD process a silane may be passed over a substrate at a temperature of between about 300° C. and 700° C. and a pressure of between about 1 Torr and 760 Torr FIG. 9 illustrates a nanostructure example during different deposition stages. First, an initial catalyst site 904a may be deposited onto the substrate 102. Precursors containing nanostructure materials are then flowed over the catalyst 904a to deposit an initial nanostructure 906b on the substrate surface, i.e., between the catalyst and the substrate. Some of the catalyst 904a may evaporate or diffuse into the deposited structure resulting in a smaller remaining catalyst site 904b. For example, gold catalyst starts evaporating at temperatures of about 500° C., while gallium and indium evaporates at even lower temperatures. Lower deposition temperatures may help to prevent evaporation and cause most of the catalyst to remain on the top of the growing nanostructure leading to a more cylindrical shape. In certain embodiments, some catalyst 908b-d may be become a part the nanostructure. If the catalyst is consumed through evaporation and/or entrapment into the nanostructure, the footprint of the catalyst site 904b-d may gradually decrease causing the cross-section of the deposited nanostructures to decrease accordingly. At the end of the deposition process, the nanostructure may have some remaining catalyst 904d.

Returning to FIG. 8, the nanostructures may be doped either during or after deposition, or both. In certain embodiments, the nanostructures are doped after deposition (block 806) using, for example, spin-on doping or ion implantation. In other embodiments, the doping is performed during deposition of the nanostructure. Doping may be performed in accordance with embodiments described above.

In certain embodiments, the nanostructures may be etched from larger bodies containing nanostructure materials. For example, a continuous layer of silicon may be deposited over a substrate. A photoresist may be then applied to the areas representative of nanostructures followed by etching between nanostructures using suitable chemical compounds of areas.

An electrode generally includes a conductive substrate that forms a continuous support structure. In certain embodiments, nanowires are first deposited onto a continuous substrate sheet, and the sheet is then cut into a shape determined by the cell design. In other embodiments, nanowires may be first deposited onto discrete particles that are then impregnated or otherwise attached to a substrate sheet or used to form a substrate sheet.

Apparatus

Figure 10:
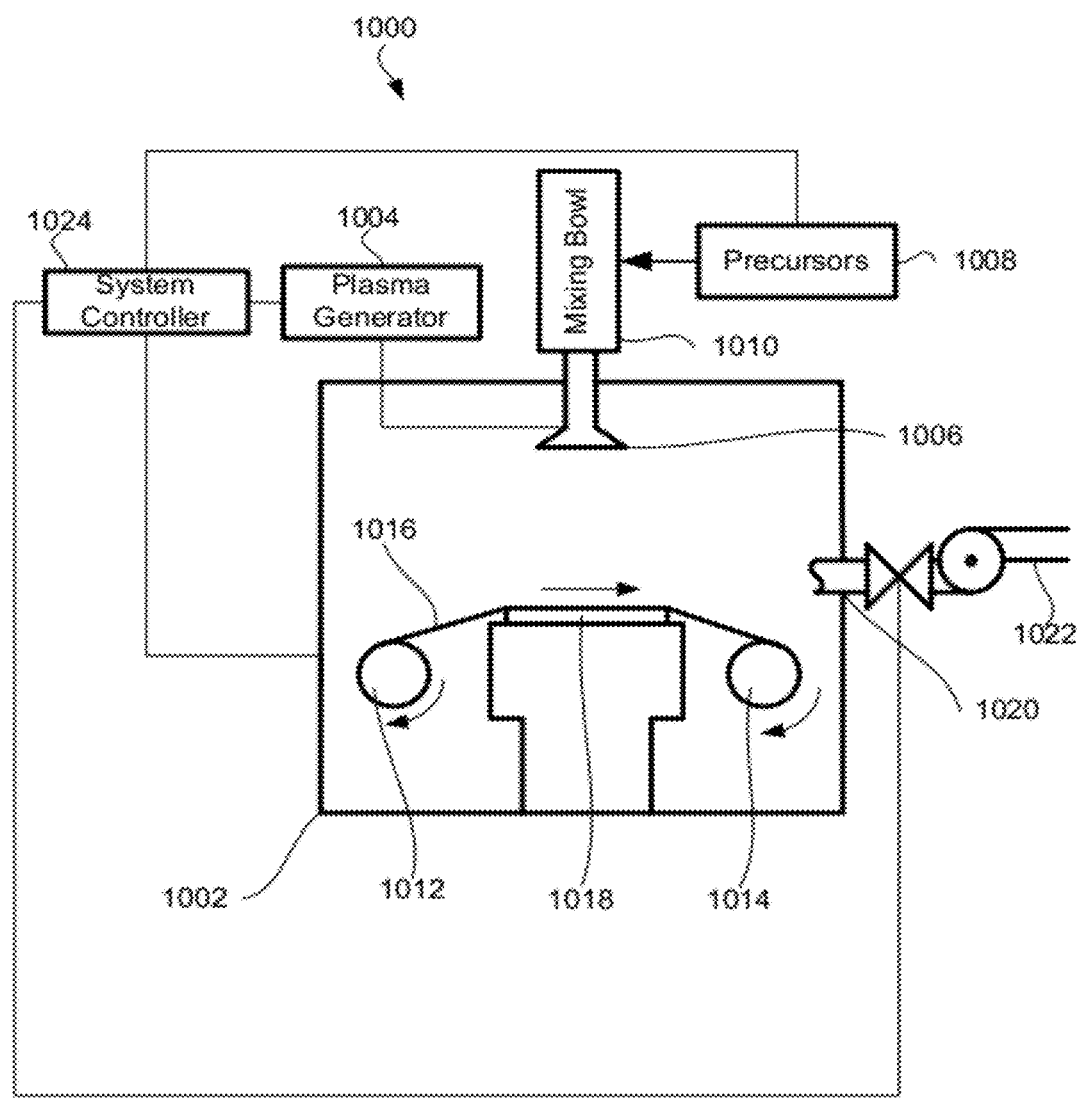
FIG. 10 illustrates a CVD apparatus example for depositing nanostructures.

FIG. 10 illustrates an example of a CVD apparatus 1000 that may be used for depositing nanostructures in accordance with certain embodiments. This may be an atmospheric plasma deposition apparatus. As shown, the apparatus 1000 includes a process chamber 1002, which encloses other components of the reactor and serves to contain the plasma, if one is used. For example, the apparatus may include plasma generator 1004 that supplies RF power to a distribution head through which precursors 1008 are fed. Alternatively, no RF power may be supplied. The precursors 1008 are usually pre-mixed in a mixing bowl 1010 to provide uniform mixture of precursors and inert materials when delivered into the process chamber 1002 though the showerhead 1006. Appropriate valving and mass flow control mechanisms are employed to ensure that the correct gases are delivered during the deposition process. In case the chemical precursor(s) is delivered in the liquid form, liquid flow control mechanisms are employed. The liquid is then vaporized and mixed with other process gases during its transportation in the mixing bowl 1010 before reaching the deposition chamber 1002.

The chamber 1002 may include a roll-to-roll substrate feeding system with an unwinding roll 1012 and a rewinding roll 1014. The substrate may be pre-treated with catalysts (e.g., gold, aluminum, iridium, etc.) and provided on the unwinding roll 1012. In certain embodiment, the catalyst treatment is performed in a CVD apparatus.

The substrate 1015 may be fed over a heater 818 positioned under the showerhead where most of the deposition occurs. Generally, the substrate 1016 is maintained at a temperature in a range of between about 25° C. and 500° C., preferably in a range of between about from 350° C. and 425° C., when passing over the heater.

Process gases exit the chamber 1002 via an outlet 1020. A vacuum pump 1022 typically draws process gases out and maintains a suitably low pressure, if used within the reactor, by a close loop controlled flow restriction device, such as a throttle valve or a pendulum valve. In a method in accordance with the invention, pressures in the reaction chamber 1002 generally are maintained in a range of between about 100 Torr and 760 Torr, more specifically in a range of between about 300 Torr and 760 Torr.

In certain embodiments, a system controller 1024 is employed to control process conditions during deposition of nanostructures and other process operations. The controller will typically include one or more memory devices and one or more processors. The processor may include a CPU or computer, analog and/or digital input/output connections, stepper motor controller boards, etc. In certain embodiments, the controller controls all of the activities of the reactor. The system controller executes system control software including sets of instructions for controlling the timing of the processing operations, pressure, precursor flow rates, temperatures of the heater, vacuum pump, plasma generator, etc. Typically, there will be a user interface associated with controller 1024. The user interface may include a display screen, graphical software displays of the apparatus and/or process conditions, and user input devices such as pointing devices, keyboards, touch screens, microphones, etc.

The computer program code for controlling the processing operations can be written in any conventional computer readable programming language: for example, assembly language, C, C++, Pascal, Fortran or others. Compiled object code or script is executed by the processor to perform the tasks identified in the program. The controller parameters relate to process conditions such as, for example, timing of the processing steps, flow rates and temperatures of precursors and inert gases, temperature of the substrate, pressure of the chamber and other parameters of a process. These parameters are provided to the user in the form of a recipe, and may be entered utilizing the user interface. Monitoring the process may be provided by analog and/or digital input connections of the system controller.

The system software may be designed or configured in many different ways. For example, various chamber component subroutines or control objects may be written to control operation of the chamber components for carrying out the inventive deposition processes. Examples of programs or sections of programs for this purpose include substrate timing of the processing steps code, flow rates, and temperatures of precursors and inert gases code, and a code for pressure of the chamber.

Cell Design

Figure 11:
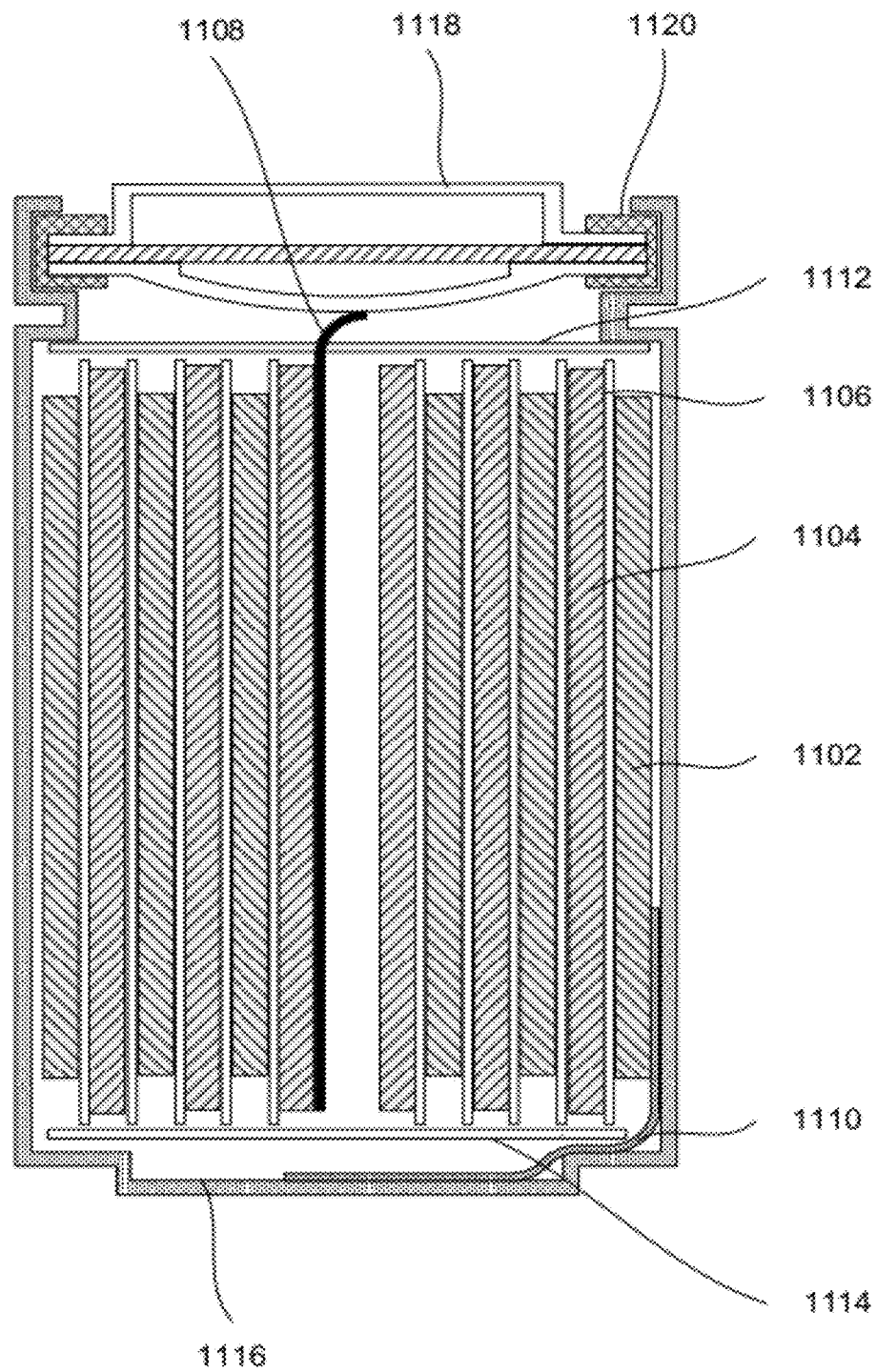
FIG. 11 illustrates a wound cell example with one or more electrodes containing nanostructures.

FIG. 11 illustrates a wound cell example showing example arrangement of cell components. A jellyroll includes a spirally wound positive electrode 1102, a negative electrode 1104, and two sheets of the separator 1106. The positive electrode 1102 and/or negative electrode 1104 may include nanostructures in accordance with certain embodiments described above. For example, the negative electrode 1104 may include silicon nanowires growth-rooted on the stainless steel foil. The positive electrode may be include an active layer with a combination of lithium cobalt oxide (or any other suitable lithium containing compound), conductive additive (e.g., acetylene black, Super P) and polymer binder (e.g., PVDF). The active layer may have density of between about 0.001 g/cm$^2$ and 0.030 g/cm$^2$ and deposited over 5-40 µm aluminum foil.

The jellyroll is inserted into a cell case 1116, and a cap 1118 and gasket 1120 are used to seal the cell. In some cases, the cap 1112 or case 1116 includes a safety device. For example, a safety vent or burst valve may be employed to break open if excessive pressure builds up in the battery, such as a current interrupting device. Also, a positive thermal coefficient (PTC) device may be incorporated into the conductive pathway of cap 1118 to reduce the damage that might result if the cell suffered a short circuit. The external surface of the cap 1118 may used as the positive terminal, while the external surface of the cell case 1116 may serve as the negative terminal. In an alternative embodiment, the polarity of the battery is reversed and the external surface of the cap 1118 is used as the negative terminal, while the external surface of the cell case 1116 serves as the positive terminal. Tabs 1108 and 1110 may be used to establish a connection between the positive and negative electrodes and the corresponding terminals. Appropriate insulating gaskets 1114 and 1112 may be inserted to prevent the possibility of internal shorting. For example, a Kapton™ film may used for internal insulation. During fabrication, the cap 1118 may be crimped to the case 1116 in order to seal the cell. However prior to this operation, electrolyte (not shown) is added to fill the porous spaces of the jellyroll.

An electrolyte may be a lithium containing salt dissolved in a solvent at concentration of between about 0.3M and 2.5M; more specifically between about 0.7M and 1.5M. One or more salts may be selected from the group including: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$. One more or more solvent may be selected from the group including: ethylene carbonate (EC), propylene carbonate (PC), butylene carbonate (BC), vinylethylene carbonate (VEC), gamma-butyrolactone (GBL), gamma-valerolactone (GVL) alpha-angelica lactone (AGL), dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC), tetrahydrofuran (THF), 2-methyltetrahydrofuran, 1,4-dioxane, 1,2-dimethoxyethane (DME), 1,2-diethoxyethane, 1,2-dibutoxyethane, acetonitrile, adiponitrile, methyl propionate, methyl pivalate, butyl pivalate and octyl pivalate, amides, dimethyl formamide, trimethyl phosphate, and trioctyl phosphate.

Experimental Example

Half cells were constructed with silicon nanowires grown on a stainless steel substrate as one electrode and lithium foil as the other electrode. The electrodes were arranged in the glass fixtures with 1.0 M $LiPF_6$ electrolyte mixed in equal parts of ethylene carbonate (EC) and diethyl carbonate (DEC) as solvent. The half cells were then tested to determine capacity retention after cycling. The results demonstrated that a capacity was about 3000 mAh/g after 20 cycles. Another set of half cells was subjected to longer cycling. The capacity of these cells was about 1000 mAh/g after 180 cycles.

CONCLUSION

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A lithium ion battery electrode comprising:
a conductive substrate; and
silicon-containing nanowires substrate-rooted to the conductive substrate, the silicon-containing nanowires having variable cross-sectional dimensions along the length of the silicon-containing nanowires and having tapered profiles with wider ends and narrower ends such that the silicon-containing nanowires taper from the wider ends to the narrower ends,
wherein one of the ends of each nanowire is substrate-rooted to the conductive substrate to provide conductive attachment and mechanical support to the silicon-containing nanowires with respect to the conductive substrate and the other of the ends of each nanowire is off the conductive substrate and wherein the silicon-containing nanowires further comprise a silicide.

2. The electrode of claim 1, wherein the silicon-containing nanowires each comprise a silicide core and a silicon shell.

3. The electrode of claim 1, wherein the conductive substrate comprises nickel.

4. The electrode of claim 1, wherein the conductive substrate is provided in the form of a structure selected from the group consisting of a mesh, a perforated sheet, a foam, and a felt.

5. The electrode of claim 1, the silicon-containing nanowires comprise substrate-rooted cores and a layer of an electrochemically active material coating the substrate-rooted cores.

6. The electrode of claim 5, wherein the electrochemically active material comprises a material selected from the group of consisting silicon, tin, and germanium.

7. The electrode of claim 6, wherein the substrate-rooted cores comprise a silicide, and wherein the electrochemically active material consists essentially of silicon.

8. The electrode of claim 1, further comprising a shell coating the silicon-containing nanowires.

9. The electrode of claim 8, wherein the shell comprises a carbon-containing material.

10. The electrode of claim 1, wherein the silicon-containing nanowires have an average aspect ratio of at least about ten.

11. The electrode of claim 1, wherein the silicon-containing nanowires have an average cross-sectional dimension of between about 1 nanometer and 10 microns on average.

12. The electrode of claim 1, wherein the silicon-containing nanowires form a layer over the conductive substrate, the layer having porosity of less than about 75 percent.

13. The electrode of claim 1, wherein the silicon-containing nanowires have an average length of at least about 100 micrometers.

14. A lithium ion battery electrode comprising:
a conductive substrate; and
silicon-containing nanowires substrate-rooted to the conductive substrate, the silicon-containing nanowires having variable cross-sectional dimensions along the length of the silicon-containing nanowires and having tapered profiles with wider ends and narrower ends such that the silicon-containing nanowires taper from the wider ends to the narrower ends, wherein one of the ends of each nanowire is substrate-rooted to the conductive substrate to provide conductive attachment and mechanical support to the silicon-containing nanowires with respect to the conductive substrate and the other of the ends of each nanowire is off the conductive substrate and wherein the silicon-containing nanowires consist essentially of silicon.

15. The electrode of claim 14, wherein the average cross-sectional dimension of the wider ends is below the silicon fracture limit.

16. The electrode of claim 1, wherein the silicon-containing nanowires are growth-rooted to the conductive substrate.

17. The electrode of claim 1, wherein the wider ends of the silicon-containing nanowires are substrate-rooted to the conductive substrate.

18. The electrode of claim 1, wherein the narrower ends of the silicon-containing nanowires are substrate-rooted to the conductive substrate.

19. The electrode of claim 1, wherein the conductive substrate and the silicon-containing nanowires have different compositions.

20. A lithium ion battery electrode comprising:
a conductive substrate; and
silicon-containing nanowires substrate-rooted to the conductive substrate, the silicon-containing nanowires having variable cross-sectional dimensions along the length of the silicon-containing nanowires and having tapered profiles with wider ends and narrower ends such that the silicon-containing nanowires taper from the wider ends to the narrower ends,
wherein one of the ends of each nanowire is substrate-rooted to the conductive substrate to provide conductive attachment and mechanical support to the silicon-containing nanowires with respect to the conductive substrate and the other of the ends of each nanowire is off the conductive substrate and wherein the conductive substrate has a conductivity of at least $10^3$ S/m.

21. The electrode of claim 20, wherein the silicon-containing nanowires further comprise a carbide.

22. The electrode of claim 20, wherein the silicon-containing nanowires each comprise a silicide core and a silicon shell.

23. The electrode of claim 20, the silicon-containing nanowires comprise substrate-rooted cores and a layer of an electrochemically active material coating the substrate-rooted cores.

24. The electrode of claim 23, wherein the electrochemically active material comprises a material selected from the group of consisting silicon, tin, and germanium.

25. The electrode of claim 24, wherein the substrate-rooted cores comprise a silicide, and wherein the electrochemically active material consists essentially of silicon.

26. The electrode of claim 23, wherein the substrate-rooted cores comprise a silicide.

27. The electrode of claim 20, wherein the wider ends of the nanowires are substrate-rooted to the conductive substrate.

28. The electrode of claim 20, wherein the narrower ends of the nanowires are substrate-rooted to the conductive substrate.

29. A lithium ion battery comprising:
a first electrode comprising the electrode of claim 20;
a second electrode; and
an electrolyte.

30. The electrode of claim 14, wherein the silicon-containing nanowires have an average aspect ratio of at least about ten.

31. The electrode of claim 12, wherein the silicon-containing nanowires have an average length of at least about 100 micrometers.

32. A lithium ion battery comprising:
a first electrode comprising the electrode of claim 1;
a second electrode; and
an electrolyte.

* * * * *